US012586563B2

(12) United States Patent
Bratt et al.

(10) Patent No.: US 12,586,563 B2
(45) Date of Patent: Mar. 24, 2026

(54) METHOD, SYSTEM AND APPARATUS FOR UNDERSTANDING AND GENERATING HUMAN CONVERSATIONAL CUES

(71) Applicant: SRI International, Menlo Park, CA (US)

(72) Inventors: Harry Bratt, Mountain View, CA (US); Kristin Precoda, Columbus, OH (US); Dimitra Vergyri, Sunnyvale, CA (US)

(73) Assignee: SRI International, Menlo Park, CA (US)

( * ) Notice: Subject to any disclaimer, the term of this patent is extended or adjusted under 35 U.S.C. 154(b) by 600 days.

(21) Appl. No.: 17/418,193

(22) PCT Filed: May 7, 2020

(86) PCT No.: PCT/US2020/031918
§ 371 (c)(1),
(2) Date: Jun. 24, 2021

(87) PCT Pub. No.: WO2020/227557
PCT Pub. Date: Nov. 12, 2020

(65) Prior Publication Data
US 2022/0115001 A1 Apr. 14, 2022

Related U.S. Application Data

(60) Provisional application No. 62/845,604, filed on May 9, 2019.

(51) Int. Cl.
*G10L 13/10* (2013.01)
*G10L 13/027* (2013.01)
(Continued)

(52) U.S. Cl.
CPC ............ *G10L 13/10* (2013.01); *G10L 13/027* (2013.01); *G10L 15/1807* (2013.01); *G10L 15/22* (2013.01); *G10L 25/63* (2013.01)

(58) Field of Classification Search
CPC ... G10L 13/10; G10L 13/027; G10L 15/1807; G10L 15/22; G10L 25/63; G10L 13/0335; G10L 25/48; G10L 2025/906
See application file for complete search history.

(56) References Cited

U.S. PATENT DOCUMENTS

| | | | |
|---|---|---|---|
| 7,076,430 | B1 | 7/2006 | Cosatto et al. |
| 7,177,810 | B2 | 2/2007 | Shriberg et al. |
| (Continued) | | | |

FOREIGN PATENT DOCUMENTS

| | | |
|---|---|---|
| JP | 1995191687 A | 7/1996 |
| JP | 2004325848 A | 6/2006 |
| (Continued) | | |

OTHER PUBLICATIONS

International Search Report and Written Opinion, PCT/US2020/031918, ISA:US, Jul. 28, 2020, 19 pp.
(Continued)

*Primary Examiner* — Athar N Pasha
(74) *Attorney, Agent, or Firm* — Rutan and Tucker, LLP

(57) ABSTRACT

A voice-based digital assistant (VDA) uses a conversation intelligence (CI) manager module having a rule-based engine on conversational intelligence to process information from one or more modules to make determinations on both i) understanding the human conversational cues and ii) generating the human conversational cues, including at least understanding and generating a backchannel utterance, in a flow and exchange of human communication in order to at least one of grab or yield a conversational floor between a user and the VDA. The CI manager module uses the rule-based engine to analyze and make a determination on a conversational cue of, at least, prosody in a user's flow of speech to generate the backchannel utterance to signal any of i) an understanding, ii) a correction, iii) a confirmation, and iv) a questioning of verbal communications conveyed
(Continued)

by the user in the flow of speech during a time frame when the user still holds the conversational floor.

20 Claims, 6 Drawing Sheets

(51) Int. Cl.

| | | |
|---|---|---|
| *G10L 15/18* | (2013.01) | |
| *G10L 15/22* | (2006.01) | |
| *G10L 25/63* | (2013.01) | |

(56) References Cited

U.S. PATENT DOCUMENTS

| | | | | |
|---|---|---|---|---|
| 7,698,141 | B2 | 4/2010 | Aoki et al. | |
| 7,822,607 | B2 | 10/2010 | Aoki et al. | |
| 8,463,726 | B2 | 6/2013 | Jerram et al. | |
| 8,843,372 | B1 | 9/2014 | Isenberg | |
| 8,949,377 | B2 | 2/2015 | Makar et al. | |
| 9,536,049 | B2 | 1/2017 | Brown et al. | |
| 9,679,558 | B2 | 6/2017 | Akbacak et al. | |
| 9,812,151 | B1* | 11/2017 | Amini ..................... | G06T 13/40 |
| 10,026,400 | B2 | 7/2018 | Gelfenbeyn et al. | |
| 2003/0097254 | A1* | 5/2003 | Holzrichter ............. | G10L 19/00 |
| | | | | 704/201 |
| 2006/0074670 | A1* | 4/2006 | Weng ..................... | G10L 15/22 |
| | | | | 704/E15.04 |
| 2006/0122083 | A1 | 6/2006 | Bennett | |
| 2006/0122834 | A1 | 6/2006 | Bennett | |
| 2006/0215824 | A1* | 9/2006 | Mitby ..................... | G10L 15/22 |
| | | | | 704/E15.04 |
| 2012/0016678 | A1 | 1/2012 | Gruber et al. | |
| 2015/0066479 | A1 | 3/2015 | Pasupalak et al. | |
| 2016/0027440 | A1 | 1/2016 | Gelfenbeyn et al. | |
| 2016/0042735 | A1* | 2/2016 | Vibbert ............... | G10L 15/1822 |
| | | | | 704/257 |
| 2017/0124457 | A1 | 5/2017 | Jerram et al. | |
| 2018/0068660 | A1 | 3/2018 | Kawahara et al. | |
| 2018/0133900 | A1* | 5/2018 | Breazeal ................ | B25J 19/026 |
| 2019/0070735 | A1* | 3/2019 | Tappeiner ............... | G10L 17/00 |
| 2019/0156831 | A1 | 5/2019 | Carbune et al. | |
| 2019/0325898 | A1* | 10/2019 | O'Hart Kinney ....... | G10L 15/02 |
| 2020/0034434 | A1* | 1/2020 | Sugiyama ............... | G06F 40/40 |

FOREIGN PATENT DOCUMENTS

| | | | |
|---|---|---|---|
| JP | 2010020273 | A | 1/2010 |
| JP | 2018040897 | A | 3/2018 |
| JP | 2018106224 | A | 1/2021 |
| WO | 2017191711 | A1 | 11/2017 |

OTHER PUBLICATIONS

Laubheimer et al. Intelligent Assistants: Creepy, Childish, or a Tool? Users' Attitudes Toward Alexa, Google Assistant, and Siri. Nielsen Norman Group. Aug. 5, 2018.

Luger et al. "Like Having a Really bad PA": The Gulf between User Expectation and Experience of Conversational Agents. Proceedings of the 2016 CHI Conference on Human Factors in Computing Systems, May 7, 2016, pp. 5286-5297.

Larson. Why don't people use Siri in public? Researchers think they have an answer. Daily Dot, Jun. 6, 2016.

Olmstead. Nearly half of Americans use digital voice assistants, mostly on their smartphones. Pew Research Center, Dec. 12, 2017.

Heitzman. How Popular is Voice Search? Higher Visibility, Jan. 1, 2019.

International Searching Authority, Notification of Transmittal of the International Search Report and the Written Opinion of the International Searching Authority, or the Declaraton; Jul. 28, 2020; 19 pages.

Japan Patent Office, Notice of Reasons for Rejection, Apr. 23, 2024, 3 pages.

Deep Earning, The Ultimate Guide to AI Model 2024, 32 pages.

Hewlett Packard Enterprise, AI Models, 15 pages.

United States Court of Appeals, Federal Circuit; *Richard A. Williamson*, Trustee for at Home Bondholders Liquidating Trust Plaintiff-Appellant v. *Citrix Online, LLC, Citrix Systems, Inc., Microsoft Corporation, Adobe Systems, Inc.*, Defendants-Appellees Webex Communications, Inc., Cisco Webex, LLC, Cisco Systems, Inc., Defedants-Appellees International Business Machines Corporation, Defndnt-Appellee; 20 pages.

AI Models: What they are and how they work (with example), 9 pages.

The Decision Lab; Artificial Intelligence Models, What are Artificial Intelligence Models?, 21pages.

\* cited by examiner

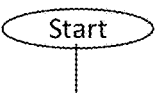

Start

A voice digital assistant (VDA) may use a conversation intelligence (CI) manager module having a rule-based engine on conversational intelligence to process information from one or more modules to make determinations on both i) understanding the human conversational cues and ii) generating the human-like conversational cues, including understanding and/or generating a backchannel utterance, in a flow and exchange of human communication in order to at least one of 1) take, grab or yield a conversational floor between a user and the VDA, or 2) establish a conversational grounding without taking the conversational floor.                                                                    202

The (CI) manager module may use the rule-based engine to analyze and make a determination on a conversational cue of, at least, prosody in a user's flow of speech to generate the backchannel utterance to signal any of i) an understanding, ii) a correction, iii) a confirmation, and iv) a questioning of verbal communications conveyed by the user in the flow of speech.                                                                    204

The CI manager module uses an automatic audio processing module and a text to speech module with the CI manager module. The CI manager module has an input to receive information on when the user is speaking and then the rule-based engine is configured to apply rules for the CI manager module to determine when to instruct the text to speech module to generate the conversational cue of 1) the backchannel utterance, 2) use pitch in a response, and 3) any combination of these two to indicate that the VDA had not yet yielded the conversational floor when the user starts speaking and interrupts the VDA's response to the user.                                                                    206

The rule-based engine analyzes and makes determinations on two or more conversational cues of i) non-lexical items, pitch of spoken words, iii) prosody of spoken words, iv) grammatical completeness of sentence syntax in the user's flow of speech, and v) pause duration, vii) degree of semantic constraints of a user's utterance. The CI manager module, after making these determinations and analysis, will then decide whether to generate an utterance in order to at least one of 1) to prompt additional information from the user, 2) to signal the VDA's agreement and understanding that the user continues to have the conversational floor, or 3) to indicate that the VDA has a desire to grab the conversational floor; as opposed to, merely waiting for a pause of a fixed duration of time and then assuming the user has yielded the conversational floor.                                                                    208

Fig. 2A             Cont.

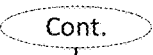

Cont.

The CI manager module uses a prosodic analyzer for a prosodic analysis on speech from the user. The CI manager module receives input data for the prosodic analysis from an automatic audio processing module. The prosodic analyzer initially checks to detect whether any speech activity is occurring from the automatic audio processing module and then to apply the prosodic analysis at an end of a user's utterance using the prosodic detector to determine i) whether the user has indeed yielded the conversational floor or ii) whether the user is inserting pauses into a flow of their speech to convey additional information, where the additional information is selected from a group consisting of 1) speaking with pauses to help convey a long list of information, 2) speaking with pauses between two or more user utterances so that the user can speak initially incompletely with a first utterance followed by a pause and then a second utterance to complete a thought the user is trying to convey with that speech activity, 3) speaking with pauses to solicit a backchannel from the system, as well as 4) any combination of these three.                        210

The CI manager module uses a dialog manager module bilaterally connected with an input and an output to the CI manager module, where the dialog manager module is configured to analyze and track at least a dialogue state, including a current topic, for an utterance and response cycle.                        212

The CI manager module digests information from at least a spoken language understanding module on micro interactions including i) a tone or pitch of voice, ii) timing information, iii) an utterance, iv) a transition word, and v) other human cue signaling a transition in the conversational floor to determine how to proceed on whether to grab or yield the conversational floor between the user and the VDA.                        214

The CI manager module uses a conversational grounding detector for determining when a mutual understanding is not occurring between a user and the VDA. Upon the CI manager module making the determination that the mutual understanding is not occurring, then the CI manager module, a natural language generation module, and a text to speech module cooperate to utter one or more utterances to re-establish the mutual understanding. The rule-based engine uses rules to decide when the mutual understanding is not occurring between the user and the VDA.                        216

Fig. 2B

Cont.

Cont.

The CI manager module uses a disfluency detector for speech repair on disfluency information of various breaks of i) words and sentences that are cut off mid-utterance, and/or ii) non-lexical vocables uttered while the user is speaking and holding the conversational floor, where the CI manager module is configured to work with i) an automatic audio processing module to detect the disfluency information in speech within otherwise fluent speech from the user and then ii) the rule-based engine to apply rules to note the disfluency information and either i) make use of the disfluency information to repair speech, or ii) to conversationally ground to confirm with the user that the system's understanding is correct, iii) or both.                                                                                            218

The CI manager module cooperates with a spoken language understanding module to provide input information on analyzing a user's i) emotional state during the response, ii) acoustic tone of an utterance, iii) prosody, iv) any discourse markers, as well as v) any combination of these to indicate a user's attitude conveyed in what the user is saying, from input data. The CI manager module makes a determination factoring in the emotional state, the acoustic tone of the utterance, or the discourse markers from the spoken language understanding module and then to issue its own response or adjust a state, and when issuing its own response, using a text to speech module, to 1) yield the conversational floor, 2) solicit additional information from the user, or 3) change a dialog state to change the system response to the user.                                                                                            220

The CI manager module uses the rule-based engine to analyze for and make a determination on an instance of a user self correction, and then to compensate for the user's correction when interpreting what the user is trying to convey with their verbal communication.
                                                                                            222

The CI manager module uses information about a world context in which the user is interacting with, in order to assist in determining when the user is currently distracted and less able to process speech from the VDA.
                                                                                            224

Fig. 2C                           End

METHOD, SYSTEM AND APPARATUS FOR UNDERSTANDING AND GENERATING HUMAN CONVERSATIONAL CUES

INCORPORATION BY REFERENCE

This application is a 35 U.S.C. § 371 U.S. National Stage of International Patent Application No. PCT/US2020/031918, titled "Method, System and Apparatus for Understanding and Generating Human Conversational Cues" having an International Filing Date of May 7, 2020, which claims priority under 35 USC 119 to U.S. provisional patent application Ser. No. 62/845,604, filed May 9, 2019, titled 'Method for understanding and generating human-like conversational cues.' All publications mentioned in this specification are herein incorporated by reference in their entirety to the same extent as if each individual publication was specifically and individually indicated to be incorporated by reference.

BACKGROUND

Some current Voice-based Digital Assistants (VDAs) are limited because their model of conversation is very over-simplified and come across as very robotic in nature when having a dialogue with the VDA. While humans use beyond-the-words conversational cues to establish trust and understanding while smoothly navigating complex conversations, most VDAs currently ignore such cues such as an "Uhmm" utterance, which are used to coordinate the dialogue itself (important for extended interactions), "ground" the conversation to establish a common ground, maintain trust through coordinated knowledge states, take turns, repair communication errors (and establish trust), and signal transitions. The current limited models in VDAs make users adapt or restrict their behavior, and often provide an unsatisfying experience. Open-domain VDAs are offered commercially by entities including Google, Amazon, Apple, and Microsoft. Some of the commercial systems available require strictly turn-by-turn interaction controlled by such things as a fixed timer for awaiting a response, which can be slower than necessary in some cases, and may make mistakes, i.e. incorrectly deciding when a response is complete or incomplete. Some systems can't output appropriate prosodic cues, and some systems can't make use of prosodic cues in user input. Some VDAs may require visual interaction for confirmation that the information has been exchanged successfully, which limits the situations in which a VDA can be used. Some commercial VDAs have dialogue APIs that mostly operate on text, with no prosodic information available. Currently, some common requests of a VDA are very simple (play music, manage alarms, check weather or call phone numbers, "fun questions", play voicemail, etc.).

SUMMARY

A machine, a process, and a system discuss a voice-based digital assistant (VDA) containing multiple modules for understanding and generating human conversational cues. A conversation intelligence (CI) manager module has a rule-based engine on conversational intelligence for the VDA. The CI manager module has one or more inputs to receive information from one or more other modules to make determinations on both i) understanding the human conversational cues and ii) generating the human conversational cues, including a backchannel utterance, in a flow and exchange of human communication in order to at least one of take, grab or yield a conversational floor between a user and the VDA. The CI manager module is configured to use the rule-based engine to analyze and make a determination on a conversational cue of, at least, prosody in a user's flow of speech to generate the backchannel utterance to signal any of i) an understanding, ii) a correction, iii) a confirmation, and iv) a questioning of verbal communications conveyed by the user in the flow of speech during a time frame when the user still holds the conversational floor. For example, the user may utter one or more sentences without an indication that the user is relinquishing the conversational floor; and yet, the system may merely utter a short backchannel of 'Uh Huh,' which allows the user to still hold the conversational floor and encourage additional input from the user without interrupting the natural flow of conversation coming from the user.

BRIEF DESCRIPTION OF THE DRAWINGS

FIGS. 2A-2C illustrate a flow diagram of an embodiment of a conversational engagement microservice platform containing a Conversation Intelligence (CI) manager module that has a rule-based engine on conversational intelligence for the flow of dialogue between a user and a VDA.

Figure 1:
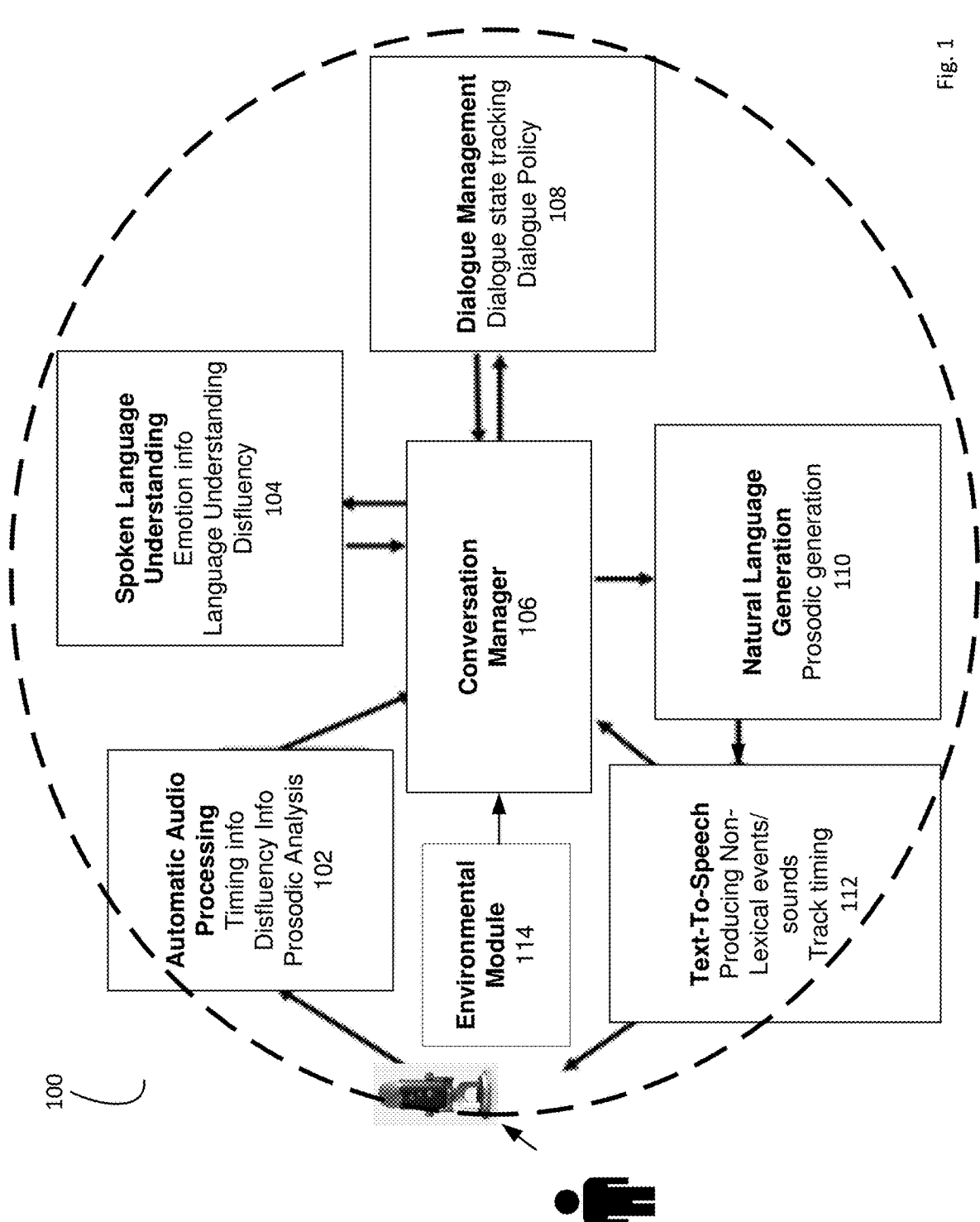
FIG. 1 illustrates a block diagram of an embodiment of a conversational engagement microservice platform containing a Conversation Intelligence (CI) manager module that has a rule-based engine on conversational intelligence for the flow of dialogue between a user and a VDA.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DETAILED DESCRIPTION

In the following description, numerous specific details can be set forth, such as examples of specific data signals, named components, number of memories, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first memory, can be made. However, the specific numeric reference should not be interpreted as a literal sequential order but rather interpreted that the first memory is different than a second memory. Thus, the specific details set forth can be merely exemplary. This disclosure describes inventive concepts with reference to specific examples. However, the intent is to cover all modifications, equivalents, and alternatives of the inventive concepts that are consistent with this disclosure. It will be apparent, however, to one of ordinary skill in the art that the present approach can be practiced without these specific details. Thus, the specific details set forth are merely exemplary, and is not intended to limit what is presently disclosed. The specific details can be varied from and still be contemplated to be within the spirit and scope of the present design. The term "coupled" is defined as meaning connected either directly to the component or indirectly to the component through one or more other components. The features implemented in one embodiment may be implemented in another embodiment where logically possible.

In general, a machine, a process, and a system are discussed that use a conversation intelligence (CI) manager module having a rule-based engine on conversational intelligence to process information from one or more modules to make determinations on both i) understanding the human conversational cues and ii) generating the human conversational cues, including a backchannel utterance, in a flow and exchange of human communication in order to at least one of take, grab or yield a conversational floor between a user and the platform hosting the CI manager module. The CI manager module may use the rule-based engine to analyze and make a determination on a conversational cue of, at least, prosody in a user's flow of speech to generate the backchannel utterance to signal any of i) an understanding, ii) a correction, iii) a confirmation, and iv) a questioning of verbal communications conveyed by the user in the flow of speech during a time frame when the user still holds the conversational floor.

Terminology

A speech disfluency may be any of various breaks, irregularities, repetitions, or non-lexical vocables that occurs within the flow of otherwise fluent speech. A speech disfluency may also be a non-relevant response by a user, such as um, I, I, um, I, well . . . , etc., who was not prepared to answer and/or respond to a question or other statement urging a response from the user.

Prosody can be concerned with those elements of speech that are not individual phonetic segments (vowels and consonants) but are properties of syllables and larger units of speech, including linguistic functions such as intonation, amplitude, tone, stress, timing, and rhythm.

A conversational floor can involve conversational turn-taking in the flow of speech and who currently has the right to speak during this turn. The conversational floor is said to belong to the person whose turn it is to speak.

A backchannel utterance can be typically a short utterance used in the two main channels of communication operating simultaneously during a conversation. All backchannels communicate acknowledgement. The predominant channel is that of the entity who has the conversational floor and is speaking; and thus, generating the primary flow of speech during their speaking turn. The secondary channel of communication is that of the listener, verbally communicating a backchannel about the primary speech flow of the entity who has the conversational floor or about the listener's state, which may be related or not related to the primary speech flow. A backchannel utterance during a conversation can occur when one participant is speaking and another participant interjects quick responses to the speech from the speaker. The backchannel response can be used for social or meta-conversational purpose, such as signifying the listener's attention, understanding or lack thereof, support/agreement, a need for clarification, surprise, sympathy, or other purpose to what the user is saying; rather than, conveying substantive information. Some examples of backchannel utterances can include such expressions as "uh-huh", "um", "mm-hm", "um-hm", "okay", "yeah", "hmm", and "right", "really?", "wow!", etc.

A non-lexical backchannel can be a vocalized sound that has little or no referential meaning but still verbalizes the listener's attention, understands, agrees with, is surprised by, is angered by, etc. the speaker's thought. For example, in the English language, sounds like "uh-huh", "mm-hm", "um-hm", and "hmm" serve this role as non-lexical backchannels.

Conversational grounding is about being on the same page about what's going on in the conversation. Conversational grounding can be a collection of "mutual knowledge and mutual beliefs" of well-known information and of items previously stated or implied in the current conversation, where the current conversation is grounded by establishing the mutual knowledge and mutual beliefs about what a speaker is saying.

Micro-interaction can be a small focused user interaction that is attempting to solve a specific problem or accomplish a specific task and is content or domain independent.

A response can include something like a direct response to the user's last statement or something else like a system request for more information.

FIG. 1 illustrates a block diagram of an embodiment of a conversational engagement microservice platform containing a Conversation Intelligence (CI) manager module that has a rule-based engine on conversational intelligence for the flow of dialogue between a user and a VDA. The multiple modules contained and cooperating within the container architecture of the conversational engagement microservice platform 100 may function and cooperate as follows.

The conversational assistant for conversational engagement platform 100 can contain various modules of a text-to-speech module 112, a dialogue management module 108, the CI manager module 106, an automatic audio processing module 102, a natural language generation module 110, a spoken language understanding module 104, an environmental module 114, and other modules. The CI manager module 106 conveys information from and to the user, establishes appropriate grounding, as well as lets the user control the flow of the information. The CI manager module 106 can use speech activity detection, prosodic analysis, and information from the dialog management module 108 to decide when to speak as well as decide what's appropriate to do in response. The CI manager module 106 can use the text-to-speech module 112 to generate a prosodically and conversationally appropriate response, which could be a backchannel or something else. The CI manager module 106 is configured to be able to generate backchannels as well as able to identify and understand backchannels generated by the user.

Conversation Intelligence (CI) Manager Module

The CI manager module 106 is configured to connect with a hub and spoke architecture to bilaterally (input & output) exchange information with and moderate with the two or more modules in this architecture rather than in a linear pipeline architecture. Each module has its own specific detector or set of detectors to detect and cooperate with the CI manager module 106 to analyze and make a determination on its own CI micro-interaction. The CI manager module 106 is configured to digest information from the two or modules on these linguistic micro-interactions; including i) tone of voice, ii) timing, iii) utterances, iv) transition words, and v) other human like cues signaling a transition in conversational floor to determine how to proceed on whether to take, grab or yield the conversational floor between the user and the VDA. In an embodiment, other architectures can be implemented as a fully connected architecture or another module collects all the information and interacts with the CI manager module 106.

The CI manager module 106 may grab to take the conversational floor. The CI manager module 106 grabs when the user hasn't relinquished the conversational floor (e.g. when the system interrupts when the user is speaking and at least momentarily stops the user from speaking; or when in multi-party interactions where it's not clear whose turn it is, the system starts talking when it is not clear that the other speakers have relinquished the floor. The VDA can have the conversational floor and the user interrupts (but not with a backchannel) or does a floor grab—then the system generally yields to the user. The VDA can also have the conversational floor and the user utters a quick backchannel, which the system recognizes but keeps the conversational floor.

The CI manager module 106 can analyze both spoken words individually and complete sentences and manage conversational cues in a flow and exchange of human communication for at least conversational floor handling in a hub and spoke architecture.

The CI manager module 106 will allow the VDA to implement fluid turns, such as using and recognizing back-channels and non-lexical sounds, recognizing conversational floor grabs or offers to yield the floor, yielding the floor and letting the user and VDA use prosody as an information-carrying channel.

In the conversational assistant for conversational engagement 100, the VDA dynamically adapts conversation aspects, such as those relating to handling the conversational floor and establishing or re-establishing conversational grounding, for both casual conversation and directed dialogue using conversational cues beyond fixed timers and lexical words. The conversational assistant for conversational engagement 100 also both understands human conversational cues and can appropriately generate human-like conversational cues in its dialogue with a user.

The CI manager module 106 will also allow VDAs to make use of mechanisms that humans use every day to manage ordinary conversations and successfully achieve and ensure mutual understanding. Conversation Intelligence includes making use of information that is normally present in human conversation, including uses of prosody, back channeling, grabbing or holding the conversational floor, and so on, and this VDA utilizes it within a new dialogue architecture that reflects the real complexity of human conversation. The CI manager module 106 controls many aspects of conversation. Grabbing or holding the floor is an action controlled by the CI manager module 106. A back-channel is a way to communicate used by and understood by the CI manager module 106. Prosody is another way that humans use to communicate, which is used by and understood by the CI manager module 106. The CI manager module 106 digests information from multiple modules; including tone of voice, timing, words and understanding, and determines how to proceed.

The CI manager module 106 has at least a rule-based engine on conversational intelligence for the VDA. The CI manager module 106 has one or more inputs to receive information from a set of modules to make determinations on both i) understanding and ii) generating human conversational cues in a flow and exchange of human communication in order to at least grab and/or yield a conversational floor handling between a user and the VDA as well as the other conversational aspects discussed herein. Note, the CI manager module 106 uses the rule-based engine to analyze and make determinations on a flow of speech to and from a user; rather than to determine the topic or content of the lexical words being spoken by the user. The CI manager module 106 uses the rule-based engine to analyze and make determinations on the flow of the speech to and from the user via analyzing, for example, non-lexical sounds, pitch and/or prosody of the spoken words, pausing, and grammatical completeness of sentence syntax. The rule-based engine uses this analysis to make determinations on, for example, what backchannel utterances to generate to signal a reaction, such as an understanding, a confirmation, or a questioning of the conveyed meaning of the words being spoken by the user, importantly while the user still holds the conversational floor. Thus, the user may utter a verbal communication, such as a sentence, and the VDA may generate a quick back-channel utterance through the text-to-speech module 112 while the user still holds the conversational floor; and thus, it remains the user's turn to talk during this dialog. For example, the user may verbally state, "Find me a hotel in Rome by Trevi Fountain." Based on the prosody and pitch of those words, and optionally a pause after the last words "Trevi Fountain," the CI manager module 106 uses the rule-based engine to analyze and make a determination. For example, does the fast paced—prosody and pitch of those words, and a timed period after the last words "Trevi Fountain" indicate that the user intends to convey additional information after this initial utterance to complete their thought? Or, does the abrupt flow of that sentence with a fall in pitch at the end of the last words "Trevi Fountain" and/or sentence-final slowing indicate that the user has completed his current thought and is intending to yield the conversational floor to await a full response from the VDA?

Again, the CI manager module 106 uses the rule-based engine to analyze and make an example determination on whether to issue a backchannel utterance, such as "Uh-mm" or "Okay", to quickly indicate that the modules of the VDA understood both the words and the conveyed meaning behind the initial thought of "Find me a hotel in Rome by Trevi Fountain" by generating this short backchannel utterance while the user still holds the conversational floor and without the VDA attempting to take the floor. The flow of the speech and its conversational cues from the user indicate that the user intends to continue with conveying additional information after this initial thought so a short back channel acknowledgement is appropriate.

Alternatively, the CI manager module 106 uses the rule-based engine to analyze and make an example determination on when the user issues a single utterance forming a complete thought, then the CI manager module 106 will know to take over the conversational floor in the on-going dialogue between the user and the VDA. For example, the VDA may then reference the dialogue manager module 108 and repeat back the current topic of the dialogue to the user with a complete utterance. For example, the VDA may state, "So then you want to make a reservation for a hotel room in Rome near walking distance within Trevi Fountain?" in order to confirm a conversational grounding for the topic and issue of the current dialog; rather than, issuing a mere backchannel of "uh-mm" in an attempt to quickly encourage more information from the user. As discussed later, the CI manager module 106 using the rule-based engine choice between a response of i) a full sentence and ii) a back channel may depend on the level of confidence of the conversational engagement 100 on understanding of the meaning behind what the user recently conveyed. Note, the full sentence response can be when the system determines that the user has given enough information (e.g. reservation for hotel in Rome near Trevi Fountain), the CI manager module 106 directs a look up for hotels meeting the criteria and simply responds with the information the user is looking for. The response of information the user is looking for implicitly conveys the confirmation of the conversational grounding for the topic and issue of the current dialog.

The CI manager module 106 analyzes and generates a system utterance. That system utterance might be a back-channel and indicate acknowledgement, or it might be indicating something else instead, such as a confirmation, correction, etc. and/or a backchannel that allows the user to keep the floor. When the system is correcting the user's understanding, or asking for more information in some way, it would have the floor.

The CI manager module 106 uses the rule-based engine to analyze and make determinations on factors of conversational cues. The rule-based engine has rules to analyze and make determinations on two or more conversational cues of i) non-lexical items, ii) pitch of spoken words, iii) prosody of spoken words, iv) grammatical completeness of sentence syntax in the user's flow of speech, and v) pause duration, vi) degree of semantic constraints of a user's utterance. Note, the pitch of spoken words can be a part of prosody. Also, a degree of semantic constraints of a user's utterance can be when a user is looking for a restaurant and then pauses a little, the system will just offer a ton of restaurant options. However, when a user is looking for an expensive Chinese restaurant, then the system would have more information and respond with maybe three options because it would be more semantically constrained.

The CI manager module, after making these determinations and analysis, can then decide whether to generate an utterance during the time frame when the user still holds the conversational floor in order to at least one of 1) to prompt additional information from the user, 2) to signal the user to hold the conversational floor and continue to speak, or 3) to indicate that the VDA has a desire to grab the conversational floor; as opposed to, merely waiting for a pause of a fixed duration of time and then assuming the user has yielded the conversational floor. Thus, the CI manager module 106 may take the conversational floor to query the user or respond to the user's request, or backchannel if the user has not relinquished the conversational floor. Note when the user has finished their utterance (which the system tells mostly by prosody), then the user will indicate they are relinquishing the floor.

The CI manager module 106 has a rule-based engine on conversational intelligence for the VDA that mediates the grabbing and/or yielding of conversational floor handling with conversational cues beyond lexical words or a fixed timer. Note, the CI manager module 106 can also use a fixed duration timer before deciding to further prompt the user but also at least looks at other conversational cues, such as i) non-lexical items, ii) prosody of spoken words, and iii) grammatical completeness of sentence syntax in the user's flow of speech for floor handling. Also note, the CI manager module 106 is configured to monitor and assist with a flow of speech in the dialogue with the user rather than duties that the dialogue management module 108 is configured to perform such as understanding and keeping track of a current topic in the dialog.

The dialogue management module 108 may have several instances created. Each dialogue management module 108 can be trained set of models on a particular domain, such as travel, medical, finance, etc., with training on identifying the topic and a template set of appropriate questions and responses with slots to populate in various facts from the current dialogue within that particular domain. However, the CI manager module 106 is configured to monitor and assist with a flow of speech in the dialogue between the user and the VDA, which generally applies across all domains of human topics.

The dialogue capability in the conversational assistant for conversational engagement 100 is enhanced via the dialogue rules in the rule-based engine to support almost human-to-human dialogue that leverages multi-modal inputs, such as understanding back channeling from the user, pitch/tone on words from the user, emotion from the user, etc. to leverage these inputs in subsequent dialogues.

An Automatic Audio Processing Input/Output Module

The Automatic Audio Processing input/output module in the CI manager module 106 has i) one or more interfaces to state data for a speech recognition process, ii) links to the state data for the end of end of speech recognition process, and iii) any combination of both from the Automatic Audio Processing module 102. The links and/or interfaces exchange information with the Automatic Audio Processing Module 102 to detect and convert the user's audio input into a text format and/or waveform format. The Automatic Audio Processing module 102 receives speech input from the user via one or more microphones. The links and/or interfaces exchange information with the Automatic Audio Processing Module 102 to detect and comprehend the user's audio input from the one or more microphones.

The CI manager module 106 has a timer for the flow of speech coming from the user. For example, the timer can be used for spoken system output (i.e. the system says something and then waits for no longer than X seconds for a response.)

The CI manager module 106 has a disfluency detector for a micro-interaction on an analysis of timing information on the flow of speech coming from the user. The timing information can be used for prosodic analysis. The timing information can also be used for a timer for determining time durations, such as a 0.75 second pause after receiving final word in a completed thought from the user, which indicates the user is yielding the conversation floor. The timing information can also be used for fixed time delay determinations. Likewise, the timing information of prosody can convey a completed thought from the user.

The automatic audio processing module 102 includes components and performs the functions of automated speech recognition including speech activity detection. The CI manager module 106 has a prosodic detector for a micro-interaction on a prosodic analysis on a rhythm and melody of the speech from the user as a conversational cue. The CI manager module 106 receives input data for the prosodic analysis from the automatic audio processing module 102. The prosodic detector is also configured to first check to detect whether any speech activity is occurring, via, for example, a timer tracking speech activity, from the automatic audio processing module 102 and then to apply a prosodic analysis at 'an end of' and/or 'during' a user's utterance user's utterance using the prosodic detector using speech analytics. The first check helps cut down on times and amount of processing to apply the prosodic analysis. In an embodiment, the prosodic detector is separate from speech activity detector.

The CI manager module 106 uses the input from the prosodic detector to determine i) whether the user has indeed yielded the conversational floor or ii) whether the user is inserting pauses into a flow of their speech to convey additional information. Note, the additional information can include 1) speaking with pauses to help convey and understand a long list of information, 2) speaking with pauses between two or more user utterances such that the user responds initially incompletely with a first utterance followed by a pause and then a later utterance to complete a thought the user is trying to convey with that speech activity, as well as 3) any combination of these two.

Spoken Language Understanding (SLU) Input/Output Module

The SLU input/output module in the CI manager module 106 has i) one or more interfaces to state data for an analysis of and understanding of words including utterances of a spoken language process, ii) links to the state data for the spoken language process, and iii) any combination of both from the SLU module 104. The links and/or interfaces exchange information with the SLU module 104 to detect and comprehend the user's audio input from one or more microphones.

The CI manager module 106 cooperates with the spoken language understanding module 104 to provide input information for micro-interactions on analyzing a user's i) emotion in the response, ii) acoustic tone of an utterance, via converting a sequence of characters into a sequence of tokens, iii) any discourse markers, as well as iv) any combination of these three to indicate a user's attitude towards what the user is saying from input data from the spoken language understanding module 104. The spoken language understanding module 104 may provide input on an emotional aspect of the verbal communication, acoustic aspect of the verbal communication, lexical word analysis of the verbal communication, and discourse markers in the verbal communication. Thus, the CI manager module 106 is configured to make a determination factoring in the emotional response, the acoustic tone of the utterance, and the discourse markers from the spoken language understanding module 104 and then to issue its own response, via a natural language generation module 110 cooperating with the text-to-speech module 112, to 1) yield the conversational floor and 2) encourage the user to express their thoughts via a back channel or take the conversational floor in order to at least ask whether the user wants to convey anything else.

Some example discourse markers to indicate a user's attitude towards what the speaker is saying may be "oh!", "well now!", "thennn . . . ", "you know", "I mean . . . ", "so!!", "because!", and, "but!!".

In an embodiment, the spoken language understanding input/output module is configured to at least use the user-state analysis from the spoken language understanding module 104 to extract the metrics that can be tied to the user through conversations with the user over multiple different periods of interaction. The spoken language understanding input/output module has one or more interfaces to and/or links to the state data from the user emotional state modules, such as SenSay and J-miner. The user emotional state modules estimate user state, including emotion, sentiment, cognition, mental health and communication quality, in a range of end applications, and the interfaces from the user-state analysis input/output module can pull or push the estimates and data from the user emotional state modules.

Natural Language Generation Input/Output Module

The natural language generation (NLG) input/output module in the CI manager module 106 has i) one or more interfaces to generate verbal communications (i.e. utterances) in a normal way and/or dialect for a given human spoken language. As discussed the CI manager module 106 and TTS module 112 can cooperate with the NLG module 110 and a given human spoken language model to generate phraseology and speech in a given human language.

The CI manager module 106 is configured to digest information from at least a spoken language understanding module 104 on micro-interactions including i) a tone or pitch of voice, ii) timing information, iii) an utterance, iv) a transition word, and v) other human cue signaling a transition in the conversational floor to determine how to proceed on whether to take, grab or yield the conversational floor between the user and the VDA.

The CI manager module 106 has an input from a conversational grounding detector for a micro-interaction on determining when a mutual understanding is not occurring between a user and the VDA. The CI manager module 106 can reference the dialogue manager module 108 to see what the dialogue manager module 108 thinks the tracked current topic is, possibly what was the immediately preceding topic, and does the thought conveyed by the speaker makes sense in that topic. When the CI manager module 106 makes the determination that the mutual understanding is not occurring, then the CI manager module 106, a natural language generation module 110, and text-to-speech module 112 are configured to cooperate to utter one or more questions to re-establish a mutual understanding for the current conversation. The rule-based engine has rules to decide when the mutual understanding is not occurring between the user and the VDA based on, for example, a confidence level. The CI manager module 106 causes the text-to-speech module 112 to utter questions to establish a mutual understanding, such as "Did you understand?", "Should I repeat something?", etc., when the sustained pause in the conversation occurs as indicated by the timer goes beyond a set time duration, as well as to instruct the natural language generation module 110 cooperating with the text-to-speech module 112 to utter a backchannel to encourage additional information from the user rather than indicating a desire to grab the conversational floor.

Text-to-Speech (TTS) Input/Output Module

The TTS input/output module in the CI manager module 106 has i) one or more interfaces to state data for a text-to-speech process, ii) links to the state data for the text-to-speech process, and iii) any combination of both from a text-to-speech component. The links and/or interfaces exchange information with i) the TTS module 112 to generate audio output from a text format or waveform format, as well as ii) work with a natural language generation module 110 to generate audio responses and queries from the CI manager module 106. The TTS module 112 uses one or more speakers to generate the audio output for the user to hear.

In an embodiment, the CI manager module 106 and text to speech module 112 cooperate to determine when output from a text to speech synthesis should produce non-lexical events and control an output timing of spoken phonemes. The text-to-speech module 112 and the CI manager module 106 can be configured to determine conversation-relevant information beyond the phonemes (i.e. paralinguistic) via using a neural network model trained using deep learning on extracting phonemes, which are long in duration (e.g. 90th percentile) for their class and annotate phrase-final prosody using pitch trajectory from a Fundamental Frequency (f0) tracker. The text-to-speech module 112 can reference a model for non-lexical sounds in each human language to assist in generating non-lexical sounds.

The natural language generation module 110 is configured to use prosody, including pitch, to enable the CI manager module 106 and the user to establish a conversational grounding via prosody when the text to speech module 112 generates speech to the user. In cases when there is ambiguity or uncertainty, the VDA and the user must resolve it and arrive at the best path forward for the user.

There are several kinds of situations in which there is ambiguity or uncertainty. For example: (a) the CI manager module 106 issues an instruction to generate a word (in text form) and isn't sure what the correct pronunciation is for the text to speech module 112 to produce, (b) the user has requested something verbally to the spoken language understanding module but the user has not provided enough information to uniquely specify the request, and is not aware the request is underspecified. (e.g. the user asks for an appliance store by name, and isn't aware that there are several branches of that store within a reasonable distance), (c) the user has requested something verbally to the spoken language understanding module without uniquely specifying it, but is aware or can be made aware by the CI manager module 106 that the requested something wasn't uniquely specified enough (e.g. the user asks for a bank by name and knows there are several branches but didn't think to say which branch they wanted). In all three of these scenarios, the user and the CI manager module 106 eliminate the ambiguity to establish conversational grounding via prosody. Likewise, the automatic audio processing module 102 is configured to analyze prosody, including pitch, from the user's speech to enable the CI manager module 106 and the user to establish the conversational grounding via detecting a prosody change on specific information within the user's speech. In both cases, the entity, hearing the change in prosody on the specific information with the uncertain status, establishes the conversational grounding via generating a vocalization, a sentence or other utterance, either i) directed at and using the specific information with the uncertain status or ii) directed to and using a logical alternative to the specific information with the uncertain status.

When there is an ambiguity, the CI manager module 106 and natural language generation module 110 cooperate to present a most likely solution via speech without needing to display other possible solutions on a display screen. The natural language generation module 110 is configured to use prosody as a side channel to a main voice channel, in such a way that the natural language generation module 110 can prosodically mark information that is uncertain. The natural language generation module 110 uses the prosody via prosodically-marking specific information that is uncertain in a verbal communication in order to highlight the specific information prosodically-marked within the verbal communication for the user to be aware of the uncertainty status of the specific information. The text to speech module 112 generates speech to the user changing prosody on specific information that is uncertain in a verbal communication. And, no additional visual channel is needed for the user to hear the prosodically marked uncertain information and understand that implicitly the prosodically marked uncertain information is in question within a larger verbal communication. When the user wants to correct and/or change the uncertain information that was prosodically-marked, the user and the CI manager module 106 implicitly understand what the uncertain information at issue is due to the prosodic side channel.

For example, suppose the user says, "what hours is Wells Fargo open?". After a quick look up, the CI manager module 106 determines that there are two nearby Wells Fargo branches. One Wells Fargo branch is on 5th Avenue and another Wells Fargo branch is on Main Street. However, supplemental information also conveys that the Wells Fargo branch on 5th Avenue is the bigger and the more frequently requested branch. The natural language generation module 110, the CI manager module 106, and the text to speech module 112 cooperate to say, for example, "The Wells Fargo on 5th Avenue is open from 9 until 6", with a slower pace prosody on "5th Avenue" and a pitch fall after "Avenue," which conversationally conveys to the user that the Wells Fargo on 5th Avenue is not the only Wells Fargo branch possibility. In general, the user may proceed in one of two possible ways. The user generally can accept this information highlighted prosodically. For example, "yes—5th Avenue." Alternatively, the user can respond to the prosodically highlighted section of the verbal communication from the VDA with a logical alternative to the specific information with the uncertain status. For example, the user might respond "Sorry, I meant the one on Main Street" or "How about the branch on Main Street?" or "Is there a branch that's open later?" The entity hearing the change in prosody on the specific information with the uncertain status, establishes the conversational grounding via generating a vocalization, a sentence or other utterance, either i) directed at and using the specific information with the uncertain status or ii) directed to and using a logical alternative to the specific information with the uncertain status.

Thus, the VDA can both understand a change in prosody on specific information to establish conversational grounding as well as use a change in prosody on specific information to establish conversational grounding.

Dialogue Management Module

The dialogue management module 108 receives metrics tied to a user from the other modules to understand a current topic and a user's emotions regarding the current topic from the spoken language understanding input/output module and then adapts dialogue from the dialogue management module 108 to the user based on the dialogue rules factoring in these different metrics. The conversational assistant's conversational content can be specified in the declarative, domain-specific dialogue specification language, which enables rapid and expressive context-aware modeling of conversational content for end users in a textual language.

The dialogue management module 108 uses rules, codified through the dialogue specification language (or again alternatively implemented with a decision tree and/or trained artificial intelligence model), to detect for when a topic shift initiated by the user occurs, as well as, when the conversational assistant should try a topic shift, and then generates an adapted user-state aware response(s) based on the conversational context. The dialogue workflow in the dialogue specification language enables expressive context-aware modeling of conversational content for end users in a textual language. Note, in an embodiment, the rules codified through the dialogue specification language (or again alternatively implemented with a decision tree and/or trained artificial intelligence model)" are dialog guidelines, dialog directions, dialog regulations, dialog factors, etc. are factors that guide the resulting outcome 'from any of' and/or 'from all 3 of' a decision tree or ML or Reinforcement learning.

The dialogue manager module 108 is bilaterally connected with an input and an output to the CI manager module 106. The dialogue manager module 108 is configured to analyze and track at least a dialogue state, including a current topic, for an utterance and response cycle.

The topic understanding input/output module detects and keeps track of topic ID in order to correctly identify the set of topics that are discussed in the free-from conversation (as opposed to a structured—menu tree type dialogue with the user). The topic understanding input/output module can store the TopicID. The hierarchical classifier and co-clustering pipeline leverages deep learning (e.g. CNNs) technologies including co-clustering and hierarchical classifiers, for identifying the topic.

Environmental Input/Output Module

In some situations, the Voice-based Digital Assistant has one or more environmental modules 114 communicatively coupled to the CI manager module 106 that are configured to provide information about a world context in which the user is interacting with. For example, when the user is driving and the VDA is integrated with or currently has a wireless communication link with the car, the environmental modules of VDA may get information from car sensors about the driving environment or about the user's driving. In another example, the environmental modules 114 of the VDA may listen to the background noise and gather information about activity surrounding the user or changes in that activity. The CI manager module 106 can use the information to assist in determining when the user is currently distracted and less able to process speech from the VDA. The rule-based engine can incorporate rules similar to those observed when a human passenger in a car stops speaking or at most conveys concise communications when the human passenger notices that the driver is having to pay greater attention to the demands of driving. Another way the CI manager module 106 of the VDA is able to tell that the user is distracted is by analyzing disfluency input from the modules and by analyzing pausing in the user's speech, and an amount of times when the user has stopped speaking abruptly without finishing their sentence.

There are two example scenarios that the rules can factor into the analysis as well. (1) The user has the conversational floor and stops speaking, and the VDA may think, based i) on external factors (e.g. input from the sensors) and/or ii) on user behavior, following the rules set out that it's likely that the user is distracted; (2) The VDA has the conversational floor and the VDA may conclude, based on external factors, that it's likely that the user is distracted at this time.

When the CI manager module 106 of the VDA has the conversational floor and is uncertain about whether the user is distracted, the CI manager module 106 uses a set of rules to try to increase its certainty by pausing at a time when a user's quick backchannel would be appropriate. Whether the user backchannels (or says something like "hang on") and how long the user takes to backchannel can provide evidence that the user is or is not distracted at this time; and hence, increase the certainty of the CI manager module 106 about the user's state.

When the CI manager module 106 of the VDA determines the user may be distracted, the CI manager module 106 will take actions to adjust its behavior to the user's attention level. (a) When the VDA has the conversational floor, such actions could include slowing down a rate of output speech from the text to speech module, pausing for longer periods of time, waiting longer for backchannels from the user, or stopping speaking for some period to avoid overloading the user. When the CI manager module 106 issues an instruction to stop speaking because it thinks the user is distracted, the CI manager module 106 can convey that it has stopped in order to avoid overloading the user and that the VDA hasn't stopped because of some error or failure of the system. The CI manager module 106 may issue an instruction to say something like "should I wait?", "should I keep going?", "let me know when you're ready", "I'll wait". When the VDA stops speaking, it may be useful to convey to the user that it was an intentional stop and not a system error of some kind, possibly by using the TTS module to generate a more human-like way of stopping speaking instead of just abruptly stopping. In an embodiment, the VDA can use other ways to convey that it's stopped in order to avoid overloading the user (without actually speaking words). Also, when the user has the conversational floor, the VDA can take an example action of waiting longer for input from the user before prompting the user to continue.

The CI manager module 106 uses rules that depend on the user's familiarity with the VDA. When the user is new to the VDA, the VDA might say something explicit like "take your time" (when the user has the floor) or "I'll wait" (when the VDA has the floor), both to teach the user that the VDA is sensitive to user distraction and to keep the user from thinking the VDA has experienced some system failure. When the user is more familiar with the VDA and won't be surprised by its capabilities, the VDA may remain silent and not say something like "should I wait". The VDA may learn over time how often the user wants to pause when they're paying attention to other things; this is a form of customization, as users may vary in their ability to handle simultaneous tasks.

The VDA stores the last few minutes of dialog and remembers that content when paused to reduce the user's overall workload. The CI manager module 106 will generate a summary of the recent dialog so that when the interaction with the VDA resumes, then the CI manager module 106 delivers the summary of the recent dialog.

The user's overall workload is reduced by not expecting the user to repeat something from what they were previously saying.

Rules Based Engine with Additional Detail

The Conversational Intelligence (CI) encoded into the rules based engine will allow VDAs to make use of mechanisms that humans use every day to manage ordinary conversations and successfully achieve and ensure mutual understanding. The CI manager module 106 looks for information that is already available in human conversation, including uses of prosody and back channeling, to grab or hold the conversational floor, and so on to reflect the real complexity of human conversation.

The CI manager module 106 uses a rule-based engine on conversational intelligence to understand and generate beyond-the-words conversational cues to establish trust while smoothly navigating complex conversations, such as i) non-lexical vocal cues, such as an "Uhmm" utterance, and ii) pitch, such as "Right!!" or "Right??", which are used to coordinate the dialogue itself, iii) "ground" the conversation and established common ground, iv) take turns holding the conversational floor, v) repair communication errors (and establish trust) to allow a user to correct a slip of the tongue, and signal transitions. The rules based engine is configured to implement linguistically motivated rules for each micro-interaction.

The CI manager module 106 uses the rule-based engine on conversational intelligence that leverages the same beyond-the-word information that SenSay (STAR speech analytics platform) uses for emotion detection, to extract conversational cues. In an embodiment, the design targets modeling only a few frequent conversational phenomena, which have a big impact on a VDA-user experience.

The CI manager module 106 may use a vocal mechanism such as a short and quick back channel of 1) a word expression and/or 2) a non-lexical utterance, during a user's turn of owning the conversational floor, in dialogue areas such as i) conversational floor holding to indicate any of A) an acknowledgement, B) a misunderstanding and/or C) a questioning of understanding what the user is currently conveying while not trying to overtly grab the conversational floor from the user and ii) conversation grounding to establish a mutual understanding of the current topic being discussed.

The CI manager module 106 has a rule-based engine on conversational intelligence for the VDA for understanding and generating human conversational cues. The conversational intelligence allows the VDA to use highly evolved conversation mechanisms. The conversational intelligence allows the VDA to use linguistic knowledge, new information beyond just words that reflects the real complexity of interaction. The CI manager module 106 allows the VDA i) to use fluid turns, ii) to recognize backchannel linguistics, iii) to wait for backchannel, iv) to recognize floor grabs to yields the floor, and v) to let the user change list presentation on the fly.

The rule-based engine has rules to analyze and make determinations on two or more conversational cues of i) non-lexical words, ii) pitch of spoken words, iii) prosody of spoken words, and iv) grammatical completeness of sentence syntax in the user's flow of speech and whether to generate an utterance during the time frame when the user still holds the conversational floor in order to at least one of 1) to prompt additional information from the user, 2) to signal the user to hold the conversational floor and continue to speak, or 3) to indicate that the VDA has a desire to grab the conversational floor; as opposed to, iii) merely waiting for a pause for a fixed duration of time and then assuming the user has yielded the conversational floor.

The CI manager module 106 cooperates with the rules based engine to apply (two or more) rules for a micro-interaction for conversational floor holding as follows. Each micro-interaction for conversational intelligence phenomena can have multiple dialogue paths for multiple conditions. Some example pseudo code is presented for linguistically motivated micro-interactions that comprise conversational intelligence phenomena.

Micro-interaction: When to Utter a Back Channel When the User Still Holds the Conversational Floor The rule-based engine can have rules to cause the CI manager module 106 to react appropriately when to utter a back channel when the user still holds the conversational floor.

The CI manager module 106 receives inputs to evaluate a user's i) tone of voice, ii) timing, iii) utterances, iv) transition words, and v) other human like cues signaling a transition in a user's flow of speech to take, grab or yield the conversational floor between the user and the VDA.

Based on the prosody, pitch, lack of transition word, and lack of other human like cues signaling a transition, make a determination that the user intends to hold the conversational floor but has conveyed one or more completed thoughts. The text-to-speech module 112 will annunciate a backchannel utterance to signal any of i) an understanding, ii) a correction, iii) a confirmation, and iv) a questioning of verbal communications conveyed by the user in the flow of speech during a time frame when the user still holds the conversational floor.

Micro-Interaction: User Has Not Completed Their Utterance/Thought

The rule-based engine can have rules to cause the CI manager module 106 to react appropriately when the user has not completed their utterance/thought, when the user has paused via
  i) Trigger: Does the speech activity detection indicate that the user has stopped talking?
  ii) Is the sentence or other linguistic thought syntactically complete or incomplete?
  iii) Determine whether the user is holding the conversational floor paralinguistically. For example, check whether the user is holding floor via prosody (e.g. prosodic end pointer uttered? or with pitch?)
  iv) In addition, determine whether the user is holding the conversational floor lexically or with non-lexical events (e.g. inhaling, lexical or non-lexical unit uttered? dental clicks?)
  v) If none of these are detected and a fixed duration of time has occurred with no speech, then determine that the user has relinquished the conversational floor.

The rule-based engine has rules to analyze and make determinations on reacting appropriately when the user has not completed their utterance, even if they've paused.
Possible Actions:
  If user is holding the floor prosodically, then:
  If no semantic content yet and/or user utterance is incomplete, then set wait time to long fixed setting and then take over conversational floor;
  Otherwise, set wait time to short fixed setting and issue back channel In parallel, determine whether the user utterance was a statement, a question, or an incomplete utterance. Next, if still waiting beyond the set wait time, then produce a backchannel appropriate to i) a statement (e.g. "okay"), or ii) an incomplete utterance (e.g. "mm-hmm"), or iii) a question with pitch (e.g. Question—"Am I right?", Backchannel—"Of course") all of which try to encourage and prompt additional information from the user.

In parallel, determine whether the user is holding the floor lexically or with non-lexical unit. If so, set the wait time to the long fixed setting. When still waiting after the timer, produce an appropriate backchannel such as "mm-hmm."

Next, determine whether user has relinquished the floor in response to the initial appropriate back channel issued by the VDA, and when determined to be relinquished, then proceed with the VDA taking over the conversational floor and issue some syntactically complete content during the VDA's turn relevant to the topic of the user's last complete thought.

Micro-Interaction: Conversational Grounding Example Case—User Self-Correction

The rule-based engine can have rules to cause the CI manager module 106 to establish conversational grounding. An example user self-correction will illustrate the principles utilized. Self-correction can include a slip of the tongue or mispronunciation. For example, the user changed their mind about what they were planning to say, or broadens their idea.

The rule-based engine can have rules to cause the CI manager module 106 to identify a user self-correction by i) detecting when the condition exists, ii) determining a level of confidence about what the user intended to correct when the user utters a user self-correction, and iii) taking an action to establish a mutual understanding. When the level of confidence about what the user intended to correct is below a threshold amount set by the user, then the rules dictate the particular action to take to reestablish conversational grounding. The rules establish conversational grounding to make a mutual understanding between the user and the VDA by taking the actions, e.g., asking one or more questions and/or making utterances relevant to the tracked topic, integrated with portions of the last exchange of communication between the VDA and the user.

An example of a user self-correction may be as follows. The user is conversing and states, "The first step, I mean the second, should be . . . "

The tracked topic is tracked by the dialogue manager module 108. The dialogue manager module 108 cooperates with the CI manager module 106 to identify when a lack of a mutual understanding condition exists, e.g. user self correction. The CI manager module 106 can reference the dialogue manager module 108 and other modules to determine the level of confidence about what the user intended to correct. Thus, the dialogue manager module 108 cooperating with the CI manager module 106 can identify/detect when a lack of a mutual understanding condition exists, e.g. user self correction, and then the CI manager module 106 may determine a level of confidence about what the user intended to correct. The CI manager module 106 may determine the level of confidence about what the user intended to correct in order to select what action to take i) to issue a backchannel or other quick words to reinforce the actual point being made, or ii) take over the conversational floor in order to establish a mutual understanding.

Accordingly, the CI manager module 106 will take one of a couple possible actions to establish conversational grounding. The CI manager module 106 issues instructions to produce the possible actions, such as a backchannel, a correction, a question, or a statement depending on a level of confidence of understanding.

The VDA may i) utter a questioning toned backchannel, ii) utter a few words to reestablish what word was truly meaning to say, or iii) take over the conversational floor and state with a questioning voice what the CI manager module 106 believes the current topic to be. The VDA could i) utter a questioning toned back channel, such as "Hmmm?", in order to prompt the user to positively state what the correction is. The VDA could instead ii) utter a few words, such as "Okay, the second step." In another example, the VDA may take over the conversational floor and ask, in this case, what word was truly mean, "Sorry, did you mean a first step, a second step, or something else?"

Again, in the example case of a user self-correction, when the CI manager module 106 detects that user has self-corrected an utterance, then the CI manager module 106 determines a level of confidence about what the user intended to correct. After referencing the dialogue manager module 108 and other modules, the CI manager module 106 determines the level of confidence about what the user intended to correct. When a high confidence level (e.g. >90%) that the correction is understood by the VDA exists, then the CI manager module 106 issues a quick back channel or a quick confirmation word/phrase incorporating portions of the current exchange of communications, "Yes, the second step."

However, when a low confidence level (e.g. >40%) that the correction is understood by the VDA exists, then the CI manager module 106 may issue some words or sounds to take over the conversational floor. The CI manager module 106 and natural language generation module 110 generate a sentence to convey 1) what the CI manager module's current understanding is/confirm the CI manager module's understanding of what the user meant and 2) what the user intended to state.

After the VDA issues its response, then the VDA takes a subsequent set of actions. The CI manager module 106 waits for a response from the user. When the user replies with a positive confirmation (explicit grounding has occurred and that correction is complete), and then the CI manager module 106 responds with a confirming backchannel. When the user continues the conversation with new information (implicit grounding that the correction is complete), the CI manager module 106 passes that information to the dialogue manager module 108. When an additional correction is needed, the CI manager module 106 steps back to the prior information that may need correction.

In addition, the CI manager module 106 uses the rule-based engine to analyze for and make a determination on an instance of the user correcting their own slip of a tongue or mispronunciation, and then to compensate for the user's correction when interpreting what the user is trying to convey with their verbal communication. The VDA may store a pattern of how the user corrects themselves and what mechanism works best to establish a mutual understanding. The CI manager module 106 also updates the system's internal representation/understanding as appropriate.

The CI manager module 106 can use a hand-written grammar or statistically based rule set that recognizes patterns such as "not X, Y" (stress on Y, possibly also on X).

Micro-Interaction: Pronunciation Confirmation by the VDA

The rule-based engine has rules to analyze and make determinations on a confirmation of a pronunciation by the VDA.

Trigger: The TTS module 112 tells the CI manager module 106 it isn't sure of the correct pronunciation of a word it must produce.

Action/Rule:

Instruct the TTS module 112 to produce a vocalization of that word with question intonation, slowed speech rate, and a following pause, and then continue one of two ways.

If the user corrects the pronunciation, then do the following steps:

Produce acknowledgement, including repeating the last the pronunciation; and

Store the pronunciation for future use by the TTS module 112.

Continue with output. When the user merely confirms the pronunciation "Yes", or continues on with uttering content and makes no attempt to correct pronunciation, then update and store a higher confidence for that pronunciation by the TTS module 112.

Micro-Interaction A1: A Long List of Items and/or a Complex List of Items

The rule-based engine can have rules to cause the CI manager module 106 on how the VDA should communicate a long list of items and/or complex information to a user. The CI manager module 106 exchanges inputs and outputs with a natural language generation module 110 and a text-to-speech module 112 in order to generate the human conversational cues by the VDA with the user that utilize prosodic conversational cues for the flow and exchange of human communication between the user and the VDA.

The VDA can convey a long list of information and/or complex information by breaking this information into individual chunks separated by deliberate pauses to allow sufficient comprehension of each individual chunk. The purposeful inserted pauses helps human's comprehend when conveying a long list or a complex set of information being conveyed.

If the CI manager module 106 has a long list of items/complex information to convey A) Output short, simple preface (e.g. "sure", "sure, there are a few of them")

A1) Until second to last item of list i) Preface with a discourse marker (e.g. "there's", "then I've got")

ii) Generate rise/plateau in pitch at the end of each item using the TTS iii) Set timer to pause for up to a specified amount of time after each item Pause after first list item may be longer to elicit backchannel from user and indicate to user that back channeling is possible iv) If user backchannels within the timer limit Keep track of how long user took to backchannel; if it's on the long side, decrease rate of information output from the text-to-speech module 112 for future items Stop waiting and continue with next list item v) If user speaks something other than a backchannel, determine what category of speech is it if a floor holder Pause for further input from user if a list navigation command (e.g. "repeat", "what was the first one?", or filtering request (e.g. "I need it to be less than $200"))

Repeat item, navigate list, or add filtering/constraints otherwise a full-fledged utterance Pass to dialogue manager vi) If user doesn't respond Wait until timer expires and continue with next list item B) Preface last item with "and" and generate falling pitch at end of last item.

Micro-interaction A2: A long list of items and/or a complex list of items

Next, using a similar set of rules, the rule-based engine lets the user change list presentation on the fly. The CI manager module 106 with a detector listens to hear when a long list of information is trying to be conveyed by the user in order to control timing that allows i) a person hearing a long list of information enough time to process each item in that list to be spoken and/or digested in chunks. Note, the CI manager module 106 has an input from a detector for preventing the VDA from interrupting early when the user has the conversational floor. The rule-based engine is configured to use rules to decide when the user is merely temporarily pausing but has not yet conveyed an entirety of a point the user is trying to convey.

Thus, the rule-based engine can have rules to cause the CI manager module 106 to determine whether the user is communicating a long list of items and/or a complex list of items to convey when long pauses are detected in a user's flow of speech and/or a change in pitch after a last item of the list is expressed.

A) Determine whether the speaker is inserting pauses between sets of information without wanting to yield conversational floor.

Check to see if the user is conveying:

A1) Short, simple preface words (e.g. "sure", "sure, there are a few of them"), and then A2) Until second to last item of list:

i) The user can preface items with carrier phrase (e.g. "there's", "then I've got");

ii) The user can generate a rise/plateau in pitch at the end of each item;

iii) Set timer to check for a pause for up to a specified amount of time after each item after first list item generate a backchannel to the user to encourage additional information iv) If user gives more items/information within the timer limit Keep track of how long user took to give the items/information;

v) If user speaks something other than a more items/information on the current topic, determine what category of speech is it if a floor holder Pause for further input from user if something else establish conversational grounding Pass to dialogue manager B) Check to see the user prefaces last item with an indicator like "and" and/or generated falling pitch at end of last item. Check to see if the list of items seems to be complete with the use of a backchannel—such as anything else?

Micro-interaction: Backchannel utterance with pitch to indicate the VDA has a desire to grab the conversational floor and or hold onto the conversational floor The rule-based engine can have rules to cause the CI manager module 106 to generate a backchannel utterance with pitch to indicate the VDA has a desire to grab the conversational floor and or hold onto the conversational floor.

The CI manager module 106 can cooperate with an Automatic Audio Processing module 102, a natural language generator module 110, and the text-to-speech module 112 to utter a backchannel with a pitch to convey meaning beyond just the backchannel itself. The CI manager module 106 has an input to receive information on when the user is speaking and then the rule-based engine is configured to apply rules for the CI manager to determine when to instruct the natural language generator module 110 to generate the text for the conversational cue of 1) the backchannel utterance, 2) use pitch in a response with marked up annotations on the text, and 3) any combination of these two to indicate that the VDA had not yet yielded the conversational floor when the user starts speaking and interrupts the VDA's response to the user. The CI manager module 106 cooperates with the natural language generator module 110 and text-to-speech module 112 to utter, via a speaker device, the conversational cue of 1) the backchannel utterance/expression, such as "um", and/or 2) use pitch in a response, such as raising pitch, etc., to indicate that the VDA had not yet yielded the conversational floor when the user interrupts the VDA.

Micro-Interaction: Handle Floor Collisions When the User and the VDA Start Talking Within 'X' Milliseconds of Each Other After a Pause in a Current Conversation The rule-based engine can have rules to cause the CI manager module 106 to handle a floor collision between a user and the VDA when both start talking with a sentence (beyond a back channel) within a short period of time after a pause in a current conversation. Note, floor collisions may occur in many situations and will be handled differently depending on the context.

Trigger: the user and the VDA start talking within X milliseconds of each other after a pause, such as 0.50 seconds, and both utterances have semantic content.

Actions:

The CI manager module 106 determines a length of overlap while both the VDA and the user are trying to talk. Did the user quickly relinquish the conversation floor by stopping talking or otherwise positively conveying the relinquishment of the conversation floor? The CI manager module 106 determines a dialogue state.

The CI manager module 106 determines what was happening during the pause and then what occurs after the pause:

i) If the user continues to talk, then the VDA stops talking and lets the user continue.

ii) If user stops talking, the VDA says "sorry, go ahead" and waits for user to continue.

Micro-Interaction: Hang on Direction

The rule-based engine can have rules to cause the CI manager module 106 to handle a "hang on" direction.

Trigger: the CI manager module 106 detects direction from the user to the VDA to 'hang on' or otherwise pause speaking.

Actions:

The CI manager module 106 cooperates with the natural language generator module 110 and the text-to-speech module 112 to generate an acknowledgement (e.g. "sure", "sure, let me know when you're ready", etc.)

The CI manager module 106 cooperates with the Automated Speech Recognition module 102 and the Spoken Language Understanding module 104 to enable functions to distinguish system/non-system directed speech.

When speech to hang on or otherwise pause is (likely) directed to the VDA, then the rules based engine directs:

a) Determine if the speech has semantic content

If yes the speech has semantic content, proceed with the regular dialogue system, directed by the dialogue management module 108.

If the speech does not have semantic content, start a timer.

If a system developer specified period elapses without further input from the user, the conversation intelligence manager module 106 generates instructions to confirm that the user has resumed talking to the VDA ("you ready?").

b) Determine the state of dialog

If the VDA was talking, the conversation intelligence manager module 106 can generate instructions to summarize/repeat what it was trying to convey when the hang on instruction from the user came in and/or take other actions including:

If the user was in the middle of talking, prompt again with what the VDA knows so far.

If little information has been conveyed so far on the current topic, assume the user remembers and skip the step of summarize/repeat what it was trying to convey when the hang on instruction from the user came in.

Default and if not confident of whether the user remembers the state of the information conveyed so far (grounding) or if it is quick to review dialogue state, review the state of the dialogue with the user and perform the step of summarizing/repeating what the VDA was trying to convey when the hang on instruction from the user came in.

More Detail

Prosody Analysis

In an embodiment, the VDA can make a determination on prosody as follows. The VDA finds endpoints in speech by utilizing information contained in a speech prosody model. Prosody denotes the way a speaker modulates the timing, pitch and loudness of phones, syllables, words, and phrases to convey certain aspects of meaning; informally, prosody includes what is perceived as the "rhythm" and "melody" of speech. Because users use prosody to convey non-word units of speech to listeners, the method and apparatus performs endpoint detection by extracting and interpreting the relevant prosodic properties of speech.

The input of a speech signal to the VDA is captured as a speech waveform associated with utterances spoken by user.

The speech data processing subsystem produces speech data corresponding to audio input captured from a human in the speech waveforms. An acoustic front end computes non-word analysis on the timing, the pitch and the loudness of phones and phrases to convey prosody over frames of the speech waveform. The acoustic front end includes a plurality of analytics engines each comprising a plurality of algorithms are configured different types of user state analytics including the timing, the pitch and the loudness of phones and phrases to convey prosody over frames of the speech waveform. The VDA computes and compares the data from the frames of the speech waveform to a database and subsequent classification module. Note, each sample of the speech signal is processed to generate the endpoint signal, then the next sample is processed. The new sample will be used to update the endpoint signal. The acoustic front end can include a pause analysis analytics engine, a duration pattern analytics engine, a loudness analytics engine, and a pitch processing analytics engine. Each of these analytics engines can have executable software using algorithms specifically for performing that particular function. For example, the pause analytics engine can utilize a conventional "speech/no-speech" algorithm that detects when a pause in the speech occurs. The output is a binary value that indicates whether the present speech signal sample is a portion of speech or not a portion of speech. This output and determination information can be used to identify an endpoint. Likewise, the duration pattern analytics engine analyzes whether phones are lengthened with respect to average phone durations for the user. The lengthening of phones is indicative of the user not being finished speaking. The output of this analytics engine may be a binary signal (e.g., the phone is longer than average, thus output a one; otherwise output a zero) or a probability that indicates the likelihood that the user has completed speaking in view of the phone length. Likewise, the pitch processing analytics engine nay be used to extract certain pitch parameters from the speech signal that are indicative of the user has completed an utterance. The pitch processing analytics engine extracts a fundamental pitch frequency from the speech signal and stylizes "pitch movements" of the speech signal (i.e., tracks the variations in pitch over time). Within the pitch processing analytics engine, a pitch contour is generated as a correlated sequence of pitch values. The speech signal is sampled at an appropriate rate, e.g., 8 kHz, 16 kHz and the like. The pitch parameters are extracted and computed (modeled). The sequence can be modeled in a piecewise linear model or in a polynomial of a given degree as a spline. A pitch movement model can be produced from the pitch contour using a finite state automaton or a stochastic Markov model. The model estimates the sequence of pitch movements. The pitch processing analytics engine extracts pitch features from the model at a point where the pitch features signal whether the user intended to stop, pause, continue speaking or ask a question. The features include the pitch movement slope and the pitch translation from a baseline pitch.

After analyzing a typical prosody in the speaker's, the VDA can determine sustained pauses between completed thoughts from the speaker and incomplete thoughts from the speaker.

The CI manager module 106 can detect for a sustained pause in the conversation using, for example, a timer from the ASR communicated to the CI manager module 106. In combination, the CI manager module 106 has the rules set out to understand whether the user has yielded the conversational floor or is merely inserting sustained pauses in the flow of their speech to convey additional information including speaking pauses inserted to help convey and understand long lists of information, complex information, as well as pauses inserted between two or more user utterances so that the user can respond initially incompletely with a first utterance followed by a short pause and then a second utterance to complete the thought they are trying to convey on that speech.

Reinforcement Learning

As discussed, the CI manager module can use rules and parameters on conversational intelligence for a voice-based digital assistant (VDA). The CI manager module has one or more inputs to receive information as the parameters from one or more modules to make determinations on both i) understanding the human conversational cues and ii) generating human-like conversational cues, including at least understanding and/or generating a backchannel utterance, in a flow and exchange of human communication in order to at least one of 1) take, grab, or yield a conversational floor between a user and the VDA, and 2) establish a conversational grounding without taking the conversational floor.

The CI manager module can use reinforcement learning using the rules and the parameters to analyze and make a determination on a conversational cue of, at least, prosody in a user's flow of speech. When the CI manager module decides to generate the backchannel utterance, then the CI manager module is configured to generate a command to issue the backchannel utterance to signal any of i) an understanding, ii) a prompt for further information, iii) a confirmation, and iv) a questioning of verbal communications conveyed by the user in the user's flow of speech. The CI manager module can use reinforcement learning and at least a parameter of an emotional state of the user as a reward function for the reinforcement learning.

Disfluency Information

The CI manager module 106 is configured to work with i) an automatic audio processing module 102 and/or the spoken language understanding module 104 to detect the disfluency information of breaks within otherwise fluent speech from the user and then ii) the rule-based engine to apply rules to both i) note the breaks causing the disfluency information and ii) compensate for the disfluency information.

The CI manager module 106 has an input from a disfluency detector to trigger a micro-interaction on speech repair to detect disfluency information of various breaks of i) words and sentences that are cut off mid-utterance, and/or ii) non-lexical vocables uttered while the user is speaking and holding the conversational floor. The spoken language understanding module 104 may indicate when a current flow of speech does not contain a completed thought. The CI manage module 106 cooperating with the spoken language understanding module 104 looks for grammatical completeness of sentence syntax in the flow of speech coming from the user. If a user initially responds "Yeah that looks good but . . . ", the CI manager module 106 is configured to understand that this in an incomplete human sentence. Then the user might subsequently state after the long pause "I am not sure on Tuesday, maybe Wednesday!" Thus, if the CI manager module 106 pairs this initial flow of speech with a subsequent flow of speech from the user, then possibly a grammatically complete sentence can be sent to the spoken language understanding module 104 to get a correct interpretation of the speech from the user and without taking the conversational floor from the user before they completely convey the concept in the flow of speech in which they were attempting to convey with those two broken up phrases. The CI manager module 106 by not taking the conversational floor allowed to broken up phrases to be uttered by the user completing their thought. The CI manager module 106 also takes note on the tone, pitch and/or prosody for the phrase maybe Wednesday. The CI manager module 106 applies the conversational intelligence to combine the two broken up sentences to be reprocessed by the SLU and then the modules understand the intent of the user. Everything previously stated about the reservation was okay except for a start date of Tuesday and rather the start date should in fact be Wednesday.

Addition Detail on the Dialogue Manager Module

The topic-understanding input/output module in the CI manager module 106 is configured to receive and keep track of a topic ID, derived from hierarchical classifiers for topics and co-clustering of related topics, in order to correctly identify a set of topics that are discussed in a free-form conversation between the user and the conversational assistant for conversational engagement platform 100. The topic understanding input/output module has an interface to work with the voice-based digital assistant, hierarchical classifier, and co-clustering pipeline for identifying the topic and intent regarding a topic. The information-extraction and topic-understanding input/output module can also have one or more links to the state data from the voice-based digital assistant (VDA) pipeline. The topic-understanding input/output module track inputs from the VDA pipeline including a hierarchical classifier and a co-clustering portion of the pipeline for identifying the topic and supplies this to the dialogue management module 108.

The topic understanding input/output module detects and keeps track of topic ID in order to correctly identify the set of topics that are discussed in the free-from conversation (as opposed to a structured—menu tree type dialogue with the user). The topic understanding input/output module can store the TopicID. The hierarchical classifier and co-clustering pipeline leverages deep learning (e.g. CNNs) technologies including co-clustering and hierarchical classifiers, for identifying the topic.

The dialogue manager module 108 can be configured to use a hybrid approach of 1) a rule-based engine in the dialogue manager module 108 as well as a trained, machine-learning model portion to analyze and make decisions on the dialogue state including the current topic tracking for an appropriate utterance and response cycle.

The dialogue manager module 108 is configured to listen and/or ask questions to determine whether it knows what subject/topic the user is wanting to talk about, and then once in that topic, what items of information do I need to extract details about that subject matter to 'make an end decision about the discussion'/'resolve the discussion.'

Likewise, the CI manager module 106 can be configured to use a hybrid approach of 1) a rule-based engine in the CI manager module 106 as well as a trained, machine-learning model portion to analyze and make decisions on the conversational intelligence issues discussed herein.

The conversational assistant for conversational engagement platform 100 can be a set of software microservices cooperating with a rules based engine and a hybrid rules plus machine learning engine that can perform tasks or services for an individual based on verbal commands taking into account Human conversational cues that go beyond just the spoken words. The VDA is able to interpret human speech including Human conversational cues that go beyond just the spoken words and respond via synthesized voices.

Note, the microservices can be a variant of the service-oriented architecture (SOA) architectural style that structures an application as a collection of loosely coupled services. In the microservices architecture, the services can be fine-grained and the protocols are lightweight. A benefit of decomposing an application into different smaller services is that it improves modularity. The services in the microservice architecture (MSA) can communicate over a local network using technology-agnostic protocols such as HTTP.

Again, the conversational assistant for conversational engagement tracks both conversational topic awareness and user state awareness to create extended conversations with the user. The extended conversations reveal interests, emotional state, and health of user. The extended conversations could also potentially combat early onset dementia and loneliness.

FIGS. 2A-2C illustrate a flow diagram of an embodiment of a conversational engagement microservice platform containing a Conversation Intelligence (CI) manager module that has a rule-based engine on conversational intelligence for the flow of dialogue between a user and a VDA.

In step 202, a voice-based digital assistant (VDA) may use a conversation intelligence (CI) manager module having a rule-based engine on conversational intelligence to process information from one or more modules to make modules to make determinations on both i) understanding the human conversational cues and ii) generating the human-like conversational cues, including understanding and/or generating a backchannel utterance, in a flow and exchange of human communication in order to at least one of 1) take, grab or yield a conversational floor between a user and the VDA, or 2) establish a conversational grounding without taking the conversational floor. The VDA may also use the CI manager module having the rule-based engine on conversational intelligence to process information from one or more modules to make determinations on both i) understanding the human conversational cues and ii) generating the human conversational cues, including a backchannel utterance, in a flow and exchange of human communication in order to at least one of take, grab or yield a conversational floor between a user and the VDA.

In step 204, the CI manager module may use the rule-based engine to analyze and make a determination on a conversational cue of, at least, prosody in a user's flow of speech to generate the backchannel utterance to signal any of i) an understanding, ii) a correction, iii) a confirmation, and iv) a questioning of verbal communications conveyed by the user in the flow of speech during a time frame when the user still holds the conversational floor.

In step 206, the CI manager module uses an Automatic Audio Processing module and a text to speech module with the CI manager module. The CI manager module has an input to receive information on when the user is speaking and then the rule-based engine is configured to apply rules for the CI manager module to determine when to instruct the text to speech module to generate the conversational cue of 1) the backchannel utterance, 2) use pitch in a response, and 3) any combination of these two to indicate that the VDA had not yet yielded the conversational floor when the user starts speaking and interrupts the VDA's response to the user.

In step 208, the rule-based engine analyzes and makes determinations on two or more conversational cues of i) non-lexical items (e.g. words, sounds, etc.), ii) prosody of spoken words including pitch and timing, iii) grammatical completeness of sentence syntax in the user's flow of speech, iv) pause duration for a set duration of time, and v) degree of semantic constraints of a user's utterance. The CI manager module, after making these determinations and analysis, can then decide whether to generate an utterance in order to at least one of 1) to prompt additional information from the user, 2) to signal the VDA's agreement and understanding that the user continues to have the conversational floor, or 3) to indicate that the VDA has a desire to grab the conversational floor; as opposed to, merely waiting for a pause of a fixed duration of time and then assuming the user has yielded the conversational floor. The CI manager module can decide whether to generate this utterance during the time frame when the user still holds the conversational floor.

In step 210, the CI manager module uses a prosodic analyzer for a prosodic analysis on speech from the user, such as a rhythm of the flow of speech from the user. The CI manager module receives input data for the prosodic analysis from an Automatic Audio Processing module. The prosodic detector initially checks to detect whether any speech activity is occurring from the Automatic Audio Processing module and then to apply the prosodic analysis at 'an end of' and/or 'during' a user's utterance using the prosodic detector to determine i) whether the user has indeed yielded the conversational floor or ii) whether the user is inserting pauses into a flow of their speech to convey additional information. The additional information can include any of 1) speaking with pauses to help convey and understand a long list of information, 2) speaking with pauses between two or more user utterances so that the user can respond initially incompletely with a first utterance followed by a pause and then a second utterance to complete a thought the user is trying to convey with that speech activity, as well as 3) speaking with pauses to solicit a backchannel from the system, as well as 4) any combination of these three.

In step 212, the CI manager module uses a dialogue manager module bilaterally connected with an input and an output to the CI manager module, where the dialogue manager module is configured to analyze and track at least a dialogue state, including a current topic, for an utterance and response cycle.

In step 214, the CI manager module digests information from at least a spoken language understanding module on micro interactions including i) a tone or pitch of voice, ii) timing information, iii) an utterance, iv) a transition word, and v) other human cue signaling a transition in the conversational floor to determine how to proceed on whether to at least one of take, grab, or yield the conversational floor between the user and the VDA.

In step 216, the CI manager module uses a conversational grounding detector for determining when a mutual understanding is not occurring between a user and the VDA. Upon the CI manager module making the determination that the mutual understanding is not occurring, then the CI manager module, a natural language generation module, and a text to speech module cooperate to utter one or more utterances to re-establish the mutual understanding. The rule-based engine uses rules to decide when the mutual understanding is not occurring between the user and the VDA.

In step 218, the CI manager module uses a disfluency detector to trigger a micro-interaction on speech repair to detect disfluency information of various breaks of i) words and sentences that are cut off mid-utterance, and/or ii) non-lexical vocables uttered while the user is speaking and holding the conversational floor. The CI manager module is configured to work with i) an Automatic Audio Processing module to detect the disfluency information in speech within otherwise fluent speech from the user and then ii) the rule-based engine to apply rules to note the disfluency information and either i) make use of the disfluency information to repair speech, or ii) to conversationally ground to confirm with the user that system's understanding is correct, iii) or both.

In step 220, the CI manager module cooperates with a spoken language understanding module to provide input information for a micro-interaction on analyzing a user's i) emotional state during the response, ii) acoustic tone of an utterance, iii) prosody, iv) any discourse markers, as well as v) any combination of these to indicate a user's attitude conveyed in what the user is saying, from the input data. The CI manager module makes a determination factoring in the emotional response, the acoustic tone of the utterance, or the discourse markers from the spoken language understanding module and then to issue its own response or adjust a state, and when issuing its own response, using a text to speech module, to 1) yield the conversational floor, 2) solicit additional information from the user, 3) change a dialog state to change the system response to the user or 4) encourage the user to express their thoughts or at least ask whether the user wants to convey anything.

In step 222, the CI manager module uses the rule-based engine to analyze for and make a determination on an instance of the user correcting their own slip of a tongue or mispronunciation, and then to compensate for the user's correction when interpreting what the user is trying to convey with their verbal communication.

In step 224, the CI manager module uses information about a world context in which the user is interacting with, in order to assist in determining when the user is currently distracted and less able to process speech from the VDA.

Network

Figure 3:
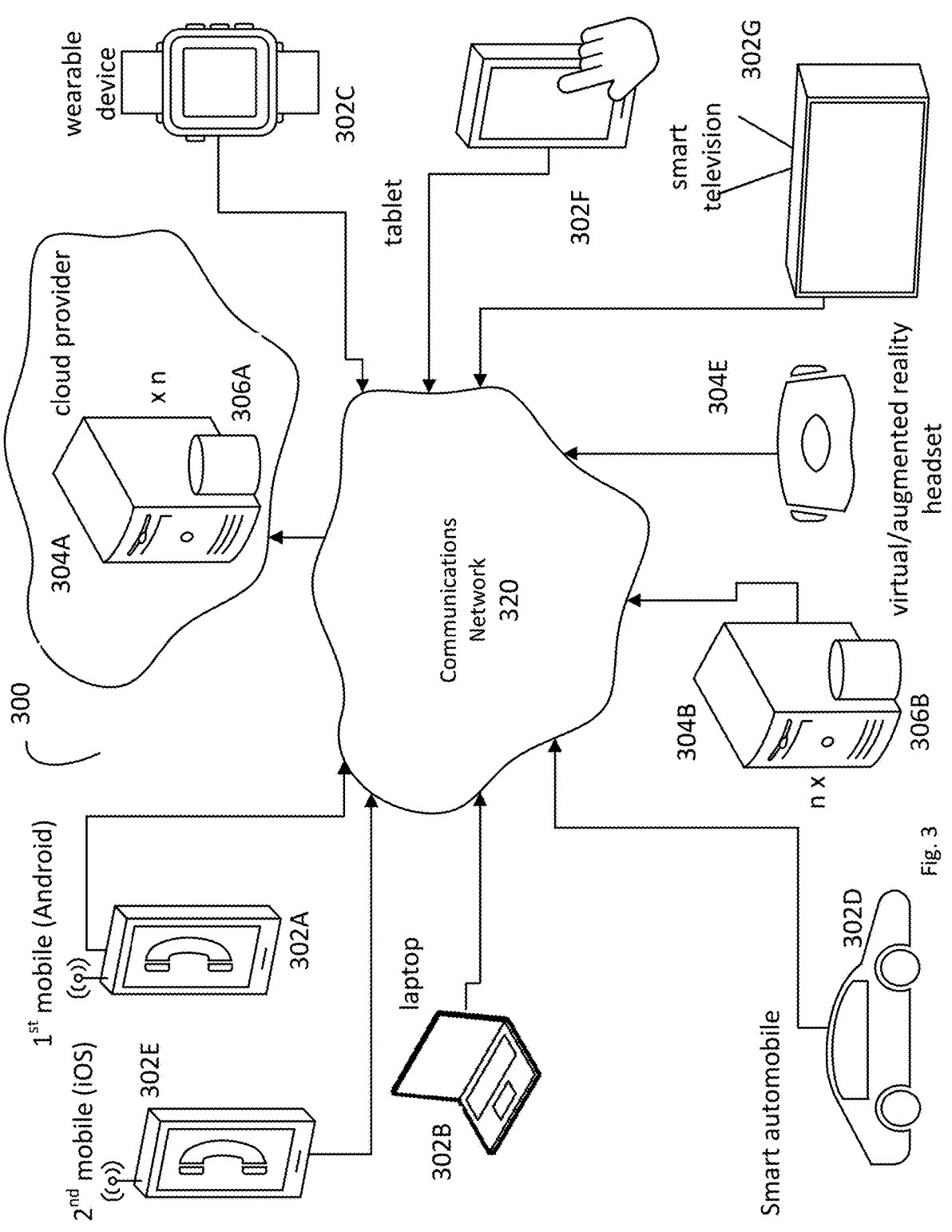
FIG. 3 illustrates a block diagram of a number of electronic systems and devices communicating with each other in a network environment in accordance with an embodiment of the conversational engagement microservice platform containing a CI manager module that has a rule-based engine.

FIG. 3 illustrates a block diagram of a number of electronic systems and devices communicating with each other in a network environment in accordance with an embodiment of the current design.

The network environment has a communications network 320 that connects server computing systems 304A through 304B, and at least one or more client computing systems 302A to 302G. As shown, there may be many server computing systems 304A through 304B and many client computing systems 302A to 302G connected to each other via the network 320, which may be, for example, the Internet. Note, that alternatively the network 320 might be or include one or more of: an optical network, a cellular network, the Internet, a Local Area Network (LAN), Wide Area Network (WAN), satellite link, fiber network, cable network, or a combination of these and/or others. Each server computing systems 304A-304B can have circuitry and software to communication with the other server computing systems 304A through 304B and the client computing systems 302A to 302G across the network 320. Each server computing systems 304A to 304B can be associated with one or more databases 306A to 3068. Each server 304A to 304B may have one or more instances of a virtual server running on that physical server and multiple virtual instances may be implemented by the design. A firewall may be established between a client computing system, for example, 302D and the network 320 to protect data integrity on the client computing system 302D.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicated use of these resources.

The user's cloud-based site is given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

The cloud-based remote access is coded to utilize a protocol, such as Hypertext Transfer Protocol (HTTP), to engage in a request and response cycle with both a mobile device application resident on a client device, 302A-302G, as well as a web-browser application resident on the client device, 302A-302G. In some situations, the cloud-based remote access for a wearable electronic device 302C, can be accessed via a mobile device, a desktop, a tablet device, cooperating with that wearable electronic device 302C. The cloud-based remote access between a client device 302A-302G and the cloud-based provider site 304A is coded to engage in one or more of the following 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud-based remote access to a wearable electronic device, and 5) combinations of these.

In an embodiment, the server computing system 304A may include a server engine, a web page management component or online service or online app component, a content management component, and a database management component. The server engine performs basic processing and operating system level tasks. The web page management component, online service, or online app component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

Computing Devices

Figure 4:
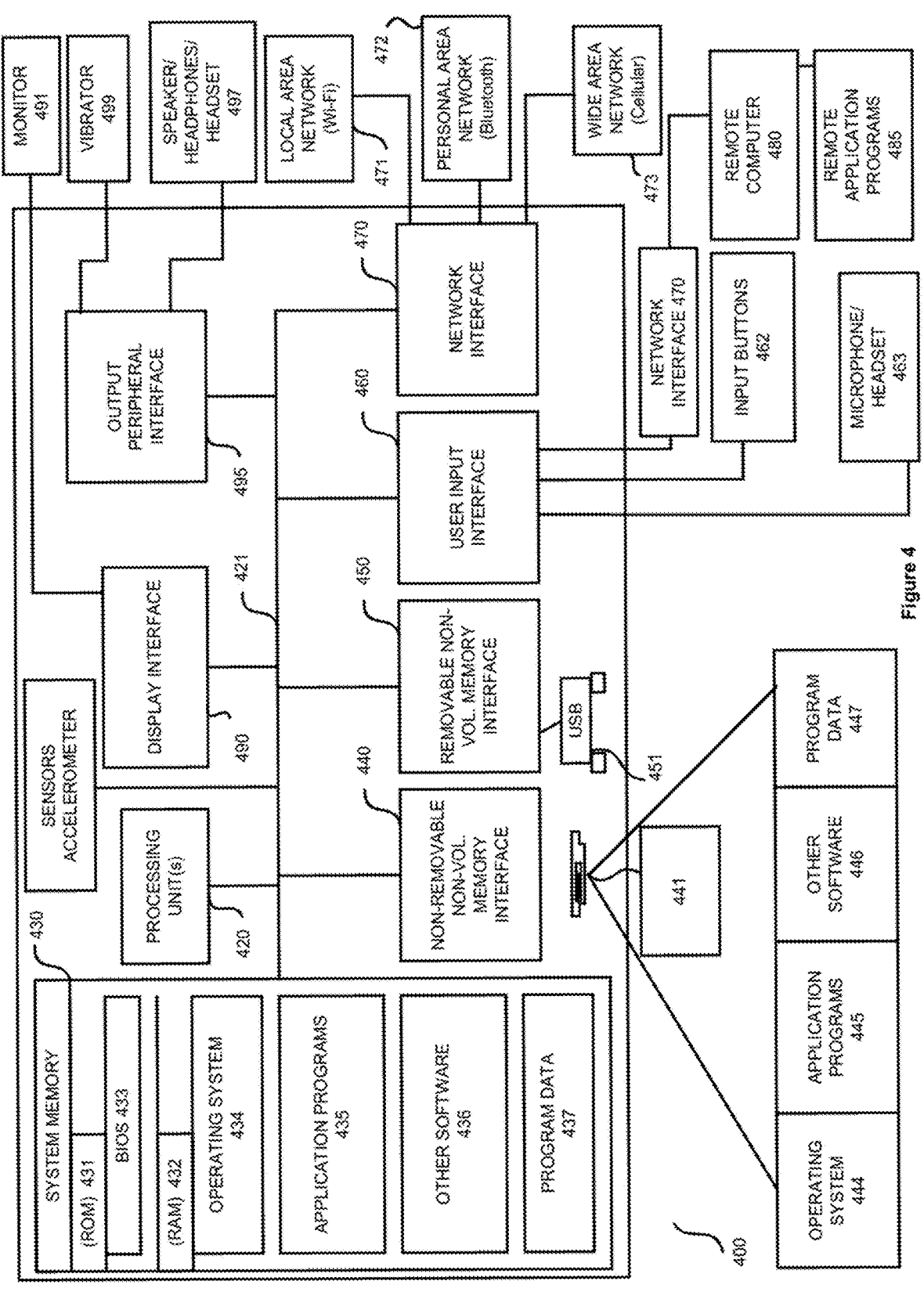
FIG. 4 illustrates a block diagram of an embodiment of one or more computing devices that can be a part of the conversational assistant for an embodiment of the current design discussed herein.

FIG. 4 illustrates a block diagram of an embodiment of one or more computing devices that can be a part of the conversational assistant for an embodiment of the current design discussed herein.

The computing device may include one or more processors or processing units 420 to execute instructions, one or more memories 430-432 to store information, one or more data input components 460-463 to receive data input from a user of the computing device 400, one or more modules that include the management module, a network interface communication circuit 470 to establish a communication link to communicate with other computing devices external to the computing device, one or more sensors where an output from the sensors is used for sensing a specific triggering condition and then correspondingly generating one or more preprogrammed actions, a display screen 491 to display at least some of the information stored in the one or more memories 430-432 and other components. Note, portions of this design implemented in software 444, 445, 446 are stored in the one or more memories 430-432 and are executed by the one or more processors 420. The processing unit 420 may have one or more processing cores, which couples to a system bus 421 that couples various system components including the system memory 430. The system bus 421 may be any of several types of bus structures selected from a memory bus, an interconnect fabric, a peripheral bus, and a local bus using any of a variety of bus architectures.

Computing device 402 typically includes a variety of computing machine-readable media. Machine-readable media can be any available media that can be accessed by computing device 402 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 402. Transitory media such as wireless channels are not included in the machine-readable media. Machine-readable media typically embody computer readable instructions, data structures, and other executable software.

In an example, a volatile memory drive 441 is illustrated for storing portions of the operating system 444, application programs 445, other executable software 446, and program data 447.

A user may enter commands and information into the computing device 402 through input devices such as a keyboard, touchscreen, or software or hardware input buttons 462, a microphone 463, a pointing device and/or scrolling input component, such as a mouse, trackball or touch pad 461. The microphone 463 can cooperate with speech recognition software. These and other input devices are often connected to the processing unit 420 through a user input interface 460 that is coupled to the system bus 421, but can be connected by other interface and bus structures, such as a lighting port, game port, or a universal serial bus (USB). A display monitor 491 or other type of display screen device is also connected to the system bus 421 via an interface, such as a display interface 490. In addition to the monitor 491, computing devices may also include other peripheral output devices such as speakers 497, a vibration device 499, and other output devices, which may be connected through an output peripheral interface 495.

The computing device 402 can operate in a networked environment using logical connections to one or more remote computers/client devices, such as a remote computing system 480. The remote computing system 480 can a personal computer, a mobile computing device, a server, a router, a network PC, a peer device or other common network node, and typically includes many or all of the elements described above relative to the computing device 402. The logical connections can include a personal area network (PAN) 472 (e.g., Bluetooth®), a local area network (LAN) 471 (e.g., Wi-Fi), and a wide area network (WAN) 473 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 402 is connected to the LAN 471 through a network interface 470, which can be, for example, a Bluetooth® or Wi-Fi adapter. When used in a WAN networking environment (e.g., Internet), the computing device 402 typically includes some means for establishing communications over the WAN 473. With respect to mobile telecommunication technologies, for example, a radio interface, which can be internal or external, can be connected to the system bus 421 via the network interface 470, or other appropriate mechanism. In a networked environment, other software depicted relative to the computing device 402, or portions thereof, may be stored in the remote memory storage device. By way of example, and not limitation, remote application programs 485 as reside on remote computing device 480. It will be appreciated that the network connections shown are examples and other means of establishing a communications link between the computing devices that may be used.

It should be noted that the present design can be carried out on a computing device such as that described with respect to this Figure. However, the present design can be carried out on a server, a computing device devoted to message handling, or on a distributed system in which different portions of the present design are carried out on different parts of the distributed computing system.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, HTTP, Java, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both.

Generally, an application includes programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed.

Accordingly, departures may be made from the foregoing design and embodiments without departing from the scope afforded by the following claims, which scope is only limited by the claims when appropriately construed.

The invention claimed is:

1. An apparatus for understanding and generating human conversational cues, comprising:

a conversation intelligence (CI) manager module having a rule-based engine on conversational intelligence for a voice-based digital assistant (VDA), where the CI manager module has one or more inputs to receive information from one or more modules to make determinations on both i) understanding the human conversational cues and ii) generating human-like conversational cues, including at least understanding and/or generating a backchannel utterance, in a flow and exchange of human communication in order to at least one of 1) take, grab or yield a conversational floor between a user and the VDA, and 2) establish a conversational grounding without taking the conversational floor, where the CI manager module is configured to use the rule-based engine to analyze and make a determination on a conversational cue of, at least, prosody in a user's speech, and when the CI manager module decides to generate the backchannel utterance, then the CI manager module is configured to generate a command to issue the backchannel utterance to signal any of i) an understanding, ii) a prompt for further information, iii) a confirmation, and iv) a questioning of verbal communications conveyed by the user in the user's speech, where the rule-based engine is configured to analyze to make a determination on what backchannel utterance to generate based upon linguistically motivated rules scripted out for two or more micro-interaction scenarios, wherein a first micro-interaction scenario is selected from a group consisting of I. to use at least one of a tone or a pitch of the VDA to determine whether to take, grab, or yield the conversational floor between the user and the VDA, II. to utter a question to establish the conversational grounding but not grab the conversational floor when a sustained pause in a conversation occurs beyond a set time duration, rather than uttering the backchannel utterance to indicate a desire of the VDA to grab the conversational floor, III. to adjust a behavior to the VDA to match a behavior of the user when the CI manager module determines the user is distracted, IV. to wait for a fixed time period and then issue the backchannel utterance to encourage additional information from the user when the user has not completed their thought, V. to issue a backchannel or other quick words to reinforce a point being made when the user generates a user self-correction in the user's speech, VI. to change a pace of how the VDA normally communicates when either the user or the VDA generates either a long list of items or a complex list of items, and VII. to generate an acknowledgement and then wait for a further user input when the user generates an indication to hang on to the VDA, and one or more non-transitory machine-readable media, one or more processors, and where algorithms of the rule-based engine and the CI manager module are implemented in hardware electronic components, software stored in the one or more non-transitory machine-readable media to be executed by the one or more processors, and any combination of both.

2. The apparatus of claim 1, where the CI manager module is configured to use the rule-based engine to analyze and make the determination on factors of conversational cues, where the rule-based engine has rules to analyze and make the determination on two or more conversational cues of any of i) non-lexical items, ii) prosody of spoken words, iii) grammatical completeness of sentence syntax in the user's speech, iv) pause duration, and v) degree of semantic constraints of a user's utterance, and where the CI manager module is configured, after making these determinations and analysis, to then decide whether to generate an utterance in order to at least one of 1) to prompt additional information from the user, 2) to signal an agreement by the VDA and understand that the user continues to have the conversational floor, or 3) to indicate that the VDA has a desire to grab the conversational floor; as opposed to, merely waiting for a pause of a fixed duration of time and then assuming the user has yielded the conversational floor.

3. The apparatus of claim 1, where the CI manager module has a prosodic analyzer for enabling a micro-interaction that requires prosodic information of the user's speech, where the CI manager module is configured to receive input data for a prosodic analysis from an automatic audio processing module, where the automatic audio processing module is configured to first check to detect whether any speech activity is occurring and then to apply the prosodic analysis on a user's utterance using the prosodic analyzer to determine i) whether the user has indeed yielded the conversational floor or ii) whether the user is inserting pauses into a flow of their speech to convey additional information, where the additional information is selected from a group consisting of 1) speaking with pauses to help convey the long list of information, 2) speaking with pauses between two or more user utterances so that the user can speak initially incompletely with a first utterance followed by a pause and then a second utterance to complete a thought the user is trying to convey with that speech activity, 3) speaking with pauses to solicit the backchannel utterance from the CI manager module, as well as 4) any combination of these three.

4. The apparatus of claim 1, where the CI manager module has an input from a conversational grounding detector for determining when a mutual understanding is not occurring between the user and the VDA, where upon the CI manager module making the determination that the mutual understanding is not occurring, then the CI manager module, a natural language generation module, and a text to speech module are configured to cooperate to utter one or more utterances to re-establish the mutual understanding, where the rule-based engine is configured to use rules to decide when the mutual understanding is not occurring between the user and the VDA.

5. The apparatus of claim 1, where the CI manager module has an input from a disfluency detector to trigger a micro-interaction on speech repair to detect disfluency information of various breaks of i) words and sentences that are cut off mid-utterance, and/or ii) non-lexical vocables uttered while the user is speaking and holding the conversational floor, where the CI manager module is configured to work with 1) an automatic audio processing module to detect the disfluency information in speech within otherwise fluent speech from the user and then 2) the rule-based engine to apply rules to note the disfluency information and either i) make use of the disfluency information to repair speech, or ii) to conversationally ground to confirm with the user that system's understanding is correct, iii) or both.

6. The apparatus of claim 1, where the CI manager module is configured to cooperate with a spoken language understanding module to provide input information on analyzing a user's i) emotional state during a response, ii) acoustic tone of an utterance, iii) prosody, iv) any discourse markers, as well as v) any combination of these to indicate a user's attitude conveyed in what the user is saying from input data, where the CI manager module is configured to make a determination factoring in the emotional state, the acoustic tone of the utterance, or the discourse markers from the spoken language understanding module and then to issue its own response or adjust a state, and when issuing its own response, using a text to speech module, to 1) yield the conversational floor, 2) solicit additional information from the user, or 3) change a dialog state to change a system response to the user.

7. The apparatus of claim 1, further comprising:
where a dialogue manager module is bilaterally connected with an input and an output to the CI manager module, where the dialogue manager module is configured to analyze and track at least a dialogue state, including a current topic, for one or more related utterances, and
where the CI manager module is configured to digest information from at least a spoken language understanding module including i) a tone or pitch of voice, ii) timing information, iii) an utterance, iv) a transition word, and v) other human cue signaling a transition in the conversational floor to determine how to proceed on whether to take, grab or yield the conversational floor between the user and the VDA.

8. The apparatus of claim 1, where the CI manager module is configured to bilaterally exchange inputs and outputs with a natural language generation module and a text to speech module in order to generate the human-like conversational cues that utilize prosodic conversational cues for the flow and exchange of human communication between the user and the VDA.

9. The apparatus of claim 1, further comprising:
one or more environmental modules communicatively coupled to the CI manager module that are configured to provide information about a world context in which the user is interacting with, where the CI manager module of the VDA is configured to use the information to assist in determining when the user is currently distracted and less able to process speech from the VDA, where the CI manager module is configured to take actions to adjust a behavior of the VDA when the user is determined to be distracted.

10. The apparatus of claim 1, further comprising:
a natural language generation module, a text to speech module, and an automatic audio processing module,
where the natural language generation module is configured to use prosody, including pitch, to enable the CI manager module and the user to establish the conversational grounding via prosody when the text to speech module generates speech to the user, where the natural language generation module is configured to use the prosody via prosodically-marking specific information that is uncertain in a verbal communication in order to highlight the specific information prosodically-marked within the verbal communication for the user to be aware of an uncertainty status of the specific information, and
where the automatic audio processing module is configured to analyze prosody, including pitch, from the user's speech to enable the CI manager module and the user to establish the conversational grounding via detecting a change in prosody on the specific information within the user's speech.

11. A method for understanding and generating human conversational cues, comprising:
utilizing a conversation intelligence (CI) manager module having a rule-based engine on conversational intelligence for a voice-based digital assistant (VDA) to process information from one or more modules to make determinations on both i) understanding the human conversational cues and ii) generating human-like conversational cues, including understanding and/or generating a backchannel utterance, in a flow and exchange of human communication in order to at least one of 1) take, grab or yield a conversational floor between a user and the VDA, and 2) establish a conversational grounding without taking the conversational floor, utilizing the rule-based engine to analyze and make a determination on a conversational cue of, at least, prosody in a user's speech to generate the backchannel utterance to signal any of i) an understanding, ii) a correction, iii) a confirmation, and iv) a questioning of verbal communications conveyed by the user in the flow of speech, utilizing the rule-based engine to analyze to make a determination on what backchannel utterances to generate based upon linguistically motivated rules scripted out for two or more micro-interaction scenarios, wherein a first micro-interaction scenario is selected from a group consisting of
I. to use at least one of a tone or a pitch of the VDA to determine whether to take, grab, or yield the conversational floor between the user and the VDA,
II. to utter a question to establish the conversational grounding but not grab the conversational floor when a sustained pause in a conversation occurs beyond a set time duration, rather than uttering the backchannel utterance to indicate a desire of the VDA to grab the conversational floor,
III. to adjust a behavior to the VDA to match a behavior of the user when the CI manager module determines the user is distracted,
IV. to wait for a fixed time period and then issue the backchannel utterance to encourage additional information from the user when the user has not completed their thought,
V. to issue a backchannel or other quick words to reinforce a point being made when the user generates a user self-correction in the user's speech, VI, to change a pace of how the VDA normally communicates when either the user or the VDA generates either a long list of items or a complex list of items, and
VII. to generate an acknowledgement and then wait for a further user input when the user generates an indication to hang on to the VDA, and using one or more non-transitory machine-readable media, one or more processors, and where algorithms of the rule-based engine and the CI manager module are implemented in hardware electronic components, software stored in the one or more non-transitory machine-readable media to be executed by the one or more processors, and any combination of both.

12. The method of claim 11, further comprising:

utilizing the rule-based engine to analyze and make the determination on two or more conversational cues of any of i) non-lexical items, ii) prosody of spoken words, iii) grammatical completeness of sentence syntax in the user's speech, iv) pause duration, and v) degree of semantic constraints of a user's utterance, where, after making these determinations and analysis, to then decide whether to generate an utterance in order to at least one of 1) to prompt additional information from the user, 2) to signal an agreement by the VDA and understanding that the user continues to have the conversational floor, or 3) to indicate that the VDA has a desire to grab the conversational floor; as opposed to, merely waiting for a pause of a fixed duration of time and then assuming the user has yielded the conversational floor.

13. The method of claim 11, further comprising:

utilizing a prosodic analyzer in the CI manager module for a prosodic analysis on of the user's speech, where the CI manager module receives input data for the prosodic analysis from an automatic audio processing module, where the prosodic analyzer first checks to detect whether any speech activity is occurring and then applies the prosodic analysis on a user's utterance using the prosodic analyzer to determine i) whether the user has indeed yielded the conversational floor or ii) whether the user is inserting pauses into a flow of their speech to convey additional information, where the additional information is selected from a group consisting of 1) speaking with pauses to help convey the long list of information, 2) speaking with pauses between two or more user utterances so that the user can speak initially incompletely with a first utterance followed by a pause and then a second utterance to complete a thought the user is trying to convey with that speech activity, 3) speaking with pauses to solicit the backchannel utterance from the CI manager module, as well as 4) any combination of these three.

14. The method of claim 11, further comprising:

utilizing a conversational grounding detector in the CI manager module for determining when a mutual understanding is not occurring between the user and the VDA, where upon the CI manager module making the determination that the mutual understanding is not occurring, then the CI manager module, a natural language generation module, and a text to speech module are configured to cooperate to utter one or more utterances to re-establish the mutual understanding, where the rule-based engine is configured to use rules to decide when the mutual understanding is not occurring between the user and the VDA.

15. The method of claim 11, further comprising:

utilizing a disfluency detector in the CI manager module for speech repair on disfluency information of various breaks of i) words and sentences that are cut off mid-utterance, and/or ii) non-lexical vocables uttered while the user is speaking and holding the conversational floor, where the CI manager module is configured to work with 1) an automatic audio processing module to detect the disfluency information in speech within otherwise fluent speech from the user and then 2) the rule-based engine to apply rules to note the disfluency information and either i) make use of the disfluency information to repair speech, or ii) to conversationally ground to confirm with the user that system's understanding is correct, iii) or both.

16. The method of claim 11, further comprising:

utilizing a spoken language understanding module to cooperate with the CI manager module to provide input information on analyzing a user's i) emotional state during a response, ii) acoustic tone of an utterance, iii) prosody, iv) any discourse markers, as well as v) any combination of these to indicate a user's attitude conveyed in what the user is saying from input data, where the CI manager module is configured to make a determination factoring in the emotional state, the acoustic tone of the utterance, or the discourse markers from the spoken language understanding module and then to issue its own response or adjust a state, and when issuing its own response, using a text to speech module, to 1) yield the conversational floor, 2) solicit additional information from the user, or 3) change a dialog state to change a system response to the user.

17. The method of claim 11, further comprising:

utilizing a dialogue manager module bilaterally connected with an input and an output to the CI manager module, where the dialogue manager module is configured to analyze and track at least a dialogue state, including a current topic, for one or more related utterances, and utilizing the CI manager module to digest information from at least a spoken language understanding module on micro-interactions including i) a tone or pitch of voice, ii) timing information, iii) an utterance, iv) a transition word, and v) other human cue signaling a transition in the conversational floor to determine how to proceed on whether to at least one of take, grab, or yield the conversational floor between the user and the VDA.

18. A non-transitory computer readable medium containing instructions, which when executed by a computing device with the one or more processors to cause said computing device to perform the method of claim 11.

19. An apparatus for understanding and generating human conversational cues, comprising:

a conversation intelligence (CI) manager module configured to use a rule-based engine configured to use rules and parameters on conversational intelligence for a voice-based digital assistant (VDA), where the CI manager module has one or more inputs to receive information as the parameters from one or more modules to make determinations on both i) understanding the human conversational cues and ii) generating human-like conversational cues, including at least understanding and/or generating a backchannel utterance, in a flow and exchange of human communication in order to at least one of 1) take, grab, or yield a conversational floor between a user and the VDA, and 2) establish a conversational grounding without taking the conversational floor, where the CI manager module is configured to use reinforcement learning using the rules and the parameters to analyze and make a determination on a conversational cue of, at least, prosody in a user's speech, and when the CI manager module decides to generate the backchannel utterance, then the CI manager module is configured to generate a command to issue the backchannel utterance to signal any of i) an understanding, ii) a prompt for further information, iii) a confirmation, and iv) a questioning of verbal communications conveyed by the user in the user's speech, where the rule-based engine is configured to analyze to make a determination on what backchannel utterances to generate based upon linguistically motivated rules scripted out for two or more micro-interaction scenarios, wherein a first micro-interaction scenario is selected from a group consisting of I. to use at least one of a tone or a pitch of the VDA to determine whether to take, grab, or yield the conversational floor between the user and the VDA, II. to utter a question to establish the conversational grounding but not grab the conversational floor when a sustained pause in a conversation occurs beyond a set time duration, rather than uttering the backchannel utterance to indicate a desire of the VDA to grab the conversational floor, III. to adjust a behavior to the VDA to match a behavior of the user when the CI manager module determines the user is distracted, IV. to wait for a fixed time period and then issue the backchannel utterance to encourage additional information from the user when the user has not completed their thought, V. to issue a backchannel or other quick words to reinforce a point being made when the user generates a user self-correction in the user's speech, VI. to change a pace of how the VDA normally communicates when either the user or the VDA generates either a long list of items or a complex list of items, and VII. to generate an acknowledgement and then wait for a further user input when the user generates an indication to hang on to the VDA, and one or more non-transitory machine-readable media, one or more processors, and where algorithms of the rule-based engine and the CI manager module are implemented in hardware electronic components, software stored in the one or more non-transitory machine-readable media to be executed by the one or more processors, and any combination of both.

20. The apparatus of claim 19, where the CI manager module is configured to use the reinforcement learning and at least a parameter of an emotional state of the user as a reward function for the reinforcement learning.

\* \* \* \* \*